(12) United States Patent
Singer et al.

(10) Patent No.: US 11,513,354 B2
(45) Date of Patent: Nov. 29, 2022

(54) LIGHT GUIDE FOR AN HMD, HMD AND METHOD FOR TRANSMITTING AN IMAGE IN AN HMD

(71) Applicant: Carl Zeiss Jena GmbH, Jena (DE)

(72) Inventors: Wolfgang Singer, Aalen (DE); Matthias Hillenbrand, Jena (DE); Hans-Juergen Dobschal, Kleinromstedt (DE)

(73) Assignee: Carl Zeiss Jena GmbH, Jena (DE)

( * ) Notice: Subject to any disclaimer, the term of this patent is extended or adjusted under 35 U.S.C. 154(b) by 286 days.

(21) Appl. No.: 16/764,386

(22) PCT Filed: Oct. 30, 2018

(86) PCT No.: PCT/EP2018/079744
§ 371 (c)(1),
(2) Date: May 14, 2020

(87) PCT Pub. No.: WO2019/096579
PCT Pub. Date: May 23, 2019

(65) Prior Publication Data
US 2020/0278547 A1 Sep. 3, 2020

(30) Foreign Application Priority Data
Nov. 15, 2017 (DE) .......................... 102017126908.8

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 27/0101* (2013.01);
(Continued)

(58) Field of Classification Search
CPC ............ G02B 27/0172; G02B 27/0081; G02B 27/0101; G02B 2027/0174; G02B 2027/0178; G02B 27/4272; G02B 6/34
See application file for complete search history.

(56) References Cited

U.S. PATENT DOCUMENTS 10,191,288 B2    1/2019   Singer et al.
2010/0220295 A1   9/2010   Mukawa et al.
(Continued)

FOREIGN PATENT DOCUMENTS

CN    106950697 A    7/2017
WO    2017120341 A1   7/2017

OTHER PUBLICATIONS

International Preliminary Report on Patentability rendered by the International Bureau of WIPO for PCT/EP2018/079744, dated May 19, 2020, 7 pages.

*Primary Examiner* — Kimberly N. Kakalec
(74) *Attorney, Agent, or Firm* — Skaar Ulbrich Macari, P.A.

(57) ABSTRACT

A light guide for guiding light for an HMD includes at least one input coupling structure and at least one output coupling structure. The output coupling structure can be oriented such that for all the rays that are coupled out by the output coupling structure and for which the wave vector k has a negative ratio ky/kxz after they have been coupled out, the wave vector k in the light guide has a ratio of ky/kxz of greater than −0.2, and/or that for all the rays that are coupled out by the output coupling structure and for which the wave vector k has a positive ratio ky/kxz after they have been coupled out, the wave vector k in the light guide has a ratio of ky/kxz of less than +0.2.

20 Claims, 9 Drawing Sheets

(52) U.S. Cl.
CPC ............ *G02B 2027/0174* (2013.01); *G02B 2027/0178* (2013.01)

(56) References Cited

U.S. PATENT DOCUMENTS

| | | |
|---|---|---|
| 2010/0321781 A1 | 12/2010 | Levola et al. |
| 2012/0062998 A1 | 3/2012 | Schultz et al. |
| 2017/0315346 A1 | 11/2017 | Tervo et al. |
| 2017/0322426 A1 | 11/2017 | Tervo |
| 2019/0011708 A1 | 1/2019 | Schultz et al. |

LIGHT GUIDE FOR AN HMD, HMD AND METHOD FOR TRANSMITTING AN IMAGE IN AN HMD

PRIORITY

This application claims the benefit of German Patent Application No. 10 2017 126 908.8, filed on Nov. 15, 2017, and which is hereby incorporated herein by reference in its entirety.

FIELD

The present invention relates to a light guide for guiding light, which can be used for a display that is to be worn on the head, also called a head-mounted display or HMD for short. In addition, the invention relates to an HMD and to a method for transmitting an image in an HMD.

BACKGROUND

One conventional form of head-mounted displays uses screens that are worn in front of the eyes and present the user with electronic images such as, for instance, computer-generated images or images recorded by cameras. Such head-mounted displays are often voluminous and do not allow direct perception of the surroundings.

In recent years, head-mounted displays which are able to combine electronic images with the directly perceived image of the surroundings and to thus present the user with an electronic image, without preventing direct perception of the surroundings, have been developed. Such head-mounted displays, which will be referred to as smartglasses hereinafter in particular if they take the form of spectacles, enable this technology to be utilized in everyday life.

When combining the electronic images with the directly perceived image of the surroundings, a distinction is essentially drawn in the case of smartglasses between the following principles on which the combining can be based:
1. Using normal spectacles with a beam combiner (e.g. beam splitter cube) attached at the front.
2. Input coupling of the light between head and spectacle lens from the side and reflection of the light at the inner side of the spectacle lens toward the eye, wherein diffraction gratings, Fresnel elements or the like can be used in a supplementary manner.
3. Guiding the light of the electronic image by way of internal reflection in the spectacle lens and combining the beam path of the electronic image with the direct image of the surroundings with the aid of an output coupling structure arranged in the spectacle lens and serving for coupling the beam path of the electronic image out of the spectacle lens in the direction of the eye. The spectacle lens is used here as a light guide of the coupled-in light.

Although the first principle functions well optically, it has found only very little social acceptance since the beam combiner attached at the front is outwardly very conspicuous and large. Moreover, the spectacles become front-heavy as a result.

The second principle can be realized anatomically only with a greatly increased distance between spectacles and head, which is likewise unacceptable.

Therefore, the more promising approaches proceed from the third principle, that is to say guiding light in the spectacle lens as a light guide. In this case, the output coupling structure can be embodied as a diffraction grating, as a partially transparent, inclined mirror or in the form of partially transparent Fresnel elements. In the case of a diffraction grating, the beam path of the electronic image is coupled out from the spectacle lens e.g. via the first order diffraction maximum, while via the zero-order diffraction maximum the observation light can pass through the output coupling structure with as little impairment as possible.

In an HMD operating in accordance with the third principle described above, divergent beams coming from a field point of the field represented by an initial image (referred to below as the initial image field) are collimated and guided in the light guide typically as collimated beams. The diameter of the beams is here defined by the entrance pupil of the imaging apparatus, of which the light guide is a part. The central rays of the beams will be referred to below as chief rays. The angle between the beams representing the left and right margins of the initial image field or between the chief rays of said beams, as it is measured in the region of the exit pupil, will be referred to as the horizontal field angle. The angle measured in the region of the exit pupil between the beams representing the vertical margins of the initial image field or between the chief rays of said beams is referred to as the vertical field angle. In the case of a large initial image field, large field angles—mainly large horizontal field angles—are present, which is the case in particular if for example an image in 16:9 format is to be represented.

To enable transmission of large field angles, it has been proposed to couple different field regions of an initial image into the light guide through different input coupling structures and to couple them out of the light guide through different output coupling structures corresponding to the input coupling structures, wherein the different field regions each cover approximately the field angle that is maximally transmittable by the light guide. The output coupling structures can then be designed such that they couple the beams of the respective regions transmitted by light guides out into different directions such that they superpose in the region of the exit pupil to again form the entire field of the initial image. Such a process is also referred to as field stitching. Such field stitching is described for example in US 2012/0062998 A1 and in WO 2017/102795 A1. Moreover, it is known, for example from US 2010/0220295 A1, WO 2017/120334 A1 and WO 2017/120341 A1, to use different diffractive input coupling and output coupling structures to couple different wavelength ranges of a color image into and out of a light guide. To couple out different wavelength ranges of a color image, grating structures that are rotated relative to one another can also be used, as is the case in WO 2017/120334 A1 and WO 2017/120341 A1.

When transmitting large fields, in particular such fields with large vertical field angles, the problem arises that the beams in the light guide are guided from the side to the output coupling structure. To ensure that the image field extends far enough up for the user of an HMD, for example by 20°, light must be coupled out from the upper region of the output coupling structure. Accordingly, light that is perceived by the user of the HMD as coming from the bottom must be coupled out from the lower region of the output coupling structure. The designations upper region of the output coupling structure and lower region of the output coupling structure here refer to the orientation of the output coupling structure if it is located in an HMD in front of the eye of a user. For the beams to be perceived as coming from the top or from the bottom, they must have the corresponding output coupling angles. If the image field has, for example, a vertical field angle of 40°, where beams at angles of −20° to +20° occur, it must be ensured that beams can exit at angles of −20° to +20° from the output coupling structure. Since the beams at angles of −20° and the beams at angles of +20° diverge with increasing distance of the exit pupil to the input coupling structure for coupling in the beams, the light guide needs to have a corresponding large extent in the region of the input coupling structure. If the light guide is embodied as a spectacle lens, this can result in the height of the spectacle lens needing to increase toward the temple, and as a result the upper edge of the spectacle lens increases toward the temple or overall needs to project far into the temple region, which can be considered to be esthetically unappealing. This issue is less critical in the region of the lower edge, but other designs of an HMD are conceivable where narrow constraints for the profile of the lower edge exist but not for the profile of the upper edge, for example if the light guide extends down from a helmet-type structure.

SUMMARY

It is therefore an object of the present invention to provide a light guide for an HMD that can have compact dimensions even in the case of large vertical field angles. It is also an object of the present invention to provide an HMD that can have compact light guides even in the case of large vertical field angles. It is a further object of the invention to provide a method for transmitting an image in an HMD, which offers greater flexibility in the case of the shaping for the light guide.

A light guide according to certain embodiments of the invention for guiding light for an HMD is provided for placement in front of an eye and may comprise: At least one input coupling structure for coupling rays of the light that is guided through the light guide into the light guide and at least one output coupling structure for coupling the rays that are guided through the light guide out of the light guide. The output coupling structure can be a reflective, a refractive or a diffractive output coupling structure. The rays are here represented in each case by wave vectors k, which in each case have, in a coordinate system having an x-axis, a y-axis and a z-axis, a component $k_{xz}$ extending in the xz-plane and with an absolute value of $k_{xz}$ and a y-component $k_y$. The absolute value of the component $k_{xz}$ extending in the xz-plane is thus $k_{xz} = \sqrt{k_x^2 + k_z^2}$. The coordinate system is in this case a coordinate system in which, when the light guide is placed in front of the eye, the normal of the light guide pointing away from the eye forms the z-axis at the center of the output coupling structure, an axis extending from temporal to nasal forms the x-axis, and an axis extending from caudal to cranial forms the y-axis. In the case of a light guide that is arranged in front of the right eye, this coordinate system is a right-handed coordinate system, in the case of a light guide that is arranged in front of the left eye, it is a left-handed coordinate system. For the following considerations, this offers the advantage that the y-axis has the same orientation in both cases.

The output coupling structure is oriented such that for all the rays that are coupled out by the output coupling structure and for which the wave vector has a negative ratio $k_y/k_{xz}$ after they have been coupled out, the wave vector in the light guide has a ratio of $k_y/k_{xz} > -0.2$. The ratio $k_y/k_{xz}$ of the wave vector in the light guide can in particular also be positive. Additionally or alternatively, the output coupling structure is oriented such that for all the rays that are coupled out by the output coupling structure and for which the wave vector has a positive ratio $k_y/k_{xz}$ after they have been coupled out, the wave vector in the light guide has a ratio of $k_y/k_{xz}$ less than +0.2. The ratio $k_y/k_{xz}$ of the wave vector in the light guide can in particular also be negative. In particular, it is advantageous if the output coupling structure is oriented such that for all the rays that are coupled out by the output coupling structure and for which the wave vector has a negative ratio $k_y/k_{xz}$ after they have been coupled out, the wave vector in the light guide has a ratio of $k_y/k_{xz} > 0$, and/or that for all the rays that are coupled out by the output coupling structure and for which the wave vector has a positive ratio $k_y/k_{xz}$ after they have been coupled out, the wave vector in the light guide has a ratio of $k_y/k_{xz} < 0$. The ratio $k_y/k_{xz}$ corresponds to the tangent of the angle of the wave vector k to the xz plane, which substantially corresponds to the horizontal plane when the eye is looking straight ahead. A negative ratio thus corresponds to a negative angle, and therefore the corresponding wave vector in the coordinate system described is perceived as coming from above. A positive ratio thus corresponds to a positive angle, and therefore the corresponding wave vector in the coordinate system described is perceived as coming from below.

The method according to certain embodiments of the invention for transmitting an image in an HMD can be realized by way of a light guide, wherein the light guide in the HMD is provided for placement in front of an eye and the rays representing the image to be transmitted are each represented by wave vectors k which, if the light guide is placed in front of the eye, each have, in a coordinate system formed by the visual axis as the z-axis, an x-axis extending from temporal to nasal, and a y-axis extending from caudal to cranial, an x-component, a y-component, and a z-component, and wherein the totality of the x-components and the y-components of the wave vectors k of the rays representing the image to be transmitted form an angular spectrum of the image to be transmitted. With the aid of the light guide according to the invention, the angular spectrum of the image to be transmitted can be transported in the interior of the light guide in a manner displaced along the y-axis compared to the angular spectrum of the image to be transmitted outside the light guide. It is also possible here to divide the angular spectrum of the image to be transmitted into at least two parts and to transport the two parts of the angular spectrum in the interior of the light guide with a different displacement along the y-axis compared to the angular spectrum of the image to be transmitted outside the light guide. The two parts of the angular spectrum can be arranged here outside the light guide one above the other, in particular in the direction of the y-axis. The method according to the invention offers great flexibility in the shaping of the light guide, since the location of the angular spectrum in the interior of the light guide can be adapted to the respective shape of the light guide, in particular to the respective profiles of the upper and lower edges of the light guide.

The orientation of the output coupling structure makes it possible to guide beams that travel with a large vertical exit angle with respect to the exit pupil of the light guide at considerably smaller angles in the light guide. As a result, the light guide can have a compact design, which makes it possible, for example in the case of a light guide that is embodied as a spectacle lens, to achieve an esthetic shape of the upper edge of the spectacle lens and/or the lower edge of the spectacles.

The light guide can have at least two input coupling structures, which each couple in one of two different subsets of rays of the light guided through the light guide. Here, the light guide also has at least two output coupling structures, wherein each of the output coupling structures is assigned to one of the input coupling structures in a way such that it couples that subset of rays out of the light guide that was coupled in by the corresponding input coupling structure. Such a design of the light guide makes possible the field stitching mentioned in the introductory part, which, in combination with the orientation according to the invention of the output coupling structure, makes possible the provision of particularly compact light guides. The subsets of rays each represent a different part of the angular spectrum of an image to be transmitted.

In the case of the light guide having at least two input coupling structures and at least two output coupling structures, the subsets of rays can differ from one another in terms of the value ranges in which the x-components $k_x$ of the wave vectors k representing them lie. Each of the output coupling structures is then oriented in each case in a way such that for all the rays of the subset of rays coupled out thereby and whose wave vector has a negative ratio $k_y/k_{xz}$, after they have been coupled out by the output coupling structure, the wave vector in the light guide has a ratio of $k_y/k_{xz}>-0.2$ and in particular $>0$ and/or that for all the rays of the subset of rays that are coupled out thereby and whose wave vector has a positive ratio $k_y/k_{xz}$, after they have been coupled out by the output coupling structure, the wave vector in the light guide has a ratio of $k_y/k_{xz}<+0.2$, in particular $<0$. In this design, the field of the initial image as it is guided through the light guide is divided into two field regions which differ from one another in the x-components of the wave vectors of their rays. Such a division corresponds to a horizontal division of the field on the initial image. The orientation of the output coupling structure is chosen here according to the invention for both field parts.

Additionally or alternatively, it is also possible that, in a light guide having at least two input coupling structures and at least two output coupling structures (which can also be at least two regions of a single output coupling structure), one of the subsets comprises rays that, after being coupled out, have negative y-components $k_y$ of the wave vectors k that represent them, and another one of the subsets comprises rays that, after being coupled out, have positive y-components $k_y$ of the wave vectors k that represent them. In this case, the subsets of rays represent parts of the angular spectrum of the image to be transmitted that are arranged one above the other in the direction of the y-axis outside the light guide. The values of the y-components $k_y$ of the wave vectors of the two subsets in this case have no or only a small overlap. An overlap of less than 10% of the respective wave vectors, preferably of less than 5% of the respective wave vectors, should here be considered a small overlap. The output coupling structure coupling out the subset of rays that comprises rays that, after they are coupled out, have negative y-components $k_y$ of the wave vectors k that represent them is oriented such that, for all the rays of the corresponding subset of rays for which the wave vector has a negative ratio $k_y/k_{xz}$ after they are coupled out through the output coupling structure, the wave vector in the light guide has a ratio of $k_y/k_{xz}>-0.2$, in particular $>0$. In addition, the output coupling structure coupling out the subset of rays that comprises rays that, after they are coupled out, have positive y-components $k_y$ of the wave vectors k that represent them is oriented such that, for all the rays of the corresponding subset of rays for which the wave vector has a positive ratio $k_y/k_{xz}$ after they are coupled out through the output coupling structure, the wave vector in the light guide has a ratio of $k_y/k_{xz}<+0.2$, in particular $<0$. In this design, the division of the field serves to guide on the one hand rays that are coupled out of the light guide at large negative angles at small negative angles or positive angles in the light guide.

On the other hand, beams that are coupled out by the output coupling structure at large positive angles are guided at small positive angles or negative angles in the light guide. This makes it possible to produce light guides with a small distance between the upper edge and the lower edge of the light guide and to transmit large vertical fields at the same time. The beam paths to the two output coupling structures can also be guided crosswise here so that the beams that are coupled out by the output coupling structure at a large positive angle travel at a negative angle in the light guide, and vice versa.

At least some of the subsets of rays can each represent a different wavelength range of the light guided through the light guide rather than different regions of the initial image. It is also possible for the light guide to comprise at least two subsidiary light guides, wherein each of the subsidiary light guides has at least one input coupling structure and one output coupling structure. By using subsidiary light guides, the subsets of rays can be reliably separated from one another as they are guided through the light guide, so that crosstalk can be avoided.

In addition, the light guide or at least one subsidiary light guide can have at least two input coupling structures and two output coupling structures. In that case, each of the output coupling structures is assigned to one of the input coupling structures. In addition, the input coupling structures and the output coupling structures are arranged relative to one another such that the rays in the light guide that are coupled in by one of the input coupling structures are not incident on an output coupling structure that is assigned to another input coupling structure. This allows spatial separation of the subsets of rays that are guided through the same light guide or the same subsidiary light guide. This geometric separation of the beam guidance in the light guide or in the subsidiary light guide also makes it possible to avoid crosstalk. Another possibility of avoiding crosstalk is by virtue of the fact that the light guide or at least one subsidiary light guide has at least two input coupling structures and two output coupling structures, wherein each of the output coupling structures is assigned to one of the input coupling structures and wherein the rays coupled out by the respective output coupling structures differ in terms of the regions in which their angles of incidence on the output coupling structures are located. This design makes it possible to avoid crosstalk even if the subsets of rays are transmitted through the same section of the light guide or the subsidiary light guide such they overlap. The selection of the correct subsets of rays is done here by way of the angle of incidence on the output coupling structures, which in this case can be realized, for example, as volume holograms.

It is advantageous if, for a coupled-out ray, the ratio $k_y/k_{xz}$ of its wave vector after it is coupled out differs from the ratio $k_y/k_{xz}$ of its wave vector before it is coupled out at least by 0.1, preferably at least by 0.2, and in particular at least by 0.3, in terms of absolute value. Additionally or alternatively, it is advantageous if, for a coupled-out ray, the ratio $k_y/k_{xz}$ of its wave vector after it is coupled out differs from the ratio $k_y/k_{xz}$ of its wave vector before it is coupled out at most by 0.9, preferably at most by 0.6, and in particular at most by 0.4, in terms of absolute value.

In an advantageous development of the light guide, the individual input coupling and output coupling structures are designed such that the coupled-out rays do not fully illuminate a specific section or a plurality of specific sections of an area located at a specific distance behind the output coupling structure. This area can be identified with the exit pupil, which is trimmed in the described design of the light guide.

The background to this is that specific regions of large image fields may be obscured by the nose, for example, so that, in the case of a viewing angle in the direction of the nose, the corresponding field region cannot be perceived. However, a field region that is not perceived does not need to be transmitted through the light guide. By omitting the transmission of non-visible field regions, the waveguide can be made even more compact.

A diffractive or reflective structure can be arranged at least between one of the existing input coupling structures and the output coupling structure that is assigned to said input coupling structure. This additional diffractive or reflective structure makes it possible to assign an input coupling structure having a specific orientation to an output coupling structure that differs in terms of its orientation from the input coupling structure. The resulting mismatch between the input coupling structure and the output coupling structure is then compensated for by the additional diffractive or reflective structure.

At least one of the output coupling structures can be an output coupling grating having a grating vector. For the rays that are coupled out by the output coupling grating, the wave vector of a coupled-out ray then results from the vectorial sum of the wave vector of the ray before it is incident on the output coupling grating and the grating vector. It is possible to design an output coupling structure as a reflective surface rather than as an output coupling grating. Yet another alternative is to design at least one of the output coupling structures as a volume hologram. Depending on the output coupling structure, the input coupling structure can be a correspondingly adapted structure, that is to say that the input coupling structure is an input coupling grating in the case of an output coupling grating, is an input coupling mirror in the case of an output coupling mirror, and is a volume hologram in the case of a volume hologram.

An HMD having a light guide according to the invention is also provided. The light guide can also have a curvature, in particular a curvature with a radius of curvature in the range from 75 to 150 mm. Radii of curvature in this range are pleasant and also acceptable with regard to the imaging quality of the imaging optical unit. Other radii of curvature would be detrimental either to ergonomics or to the imaging quality. The properties of the HMDs according to the invention and its advantages result directly from the properties and advantages of the light guide that have already been described.

Further features, properties and advantages of the present invention will become apparent from the following description of exemplary embodiments with reference to the accompanying figures.

Figure 1:
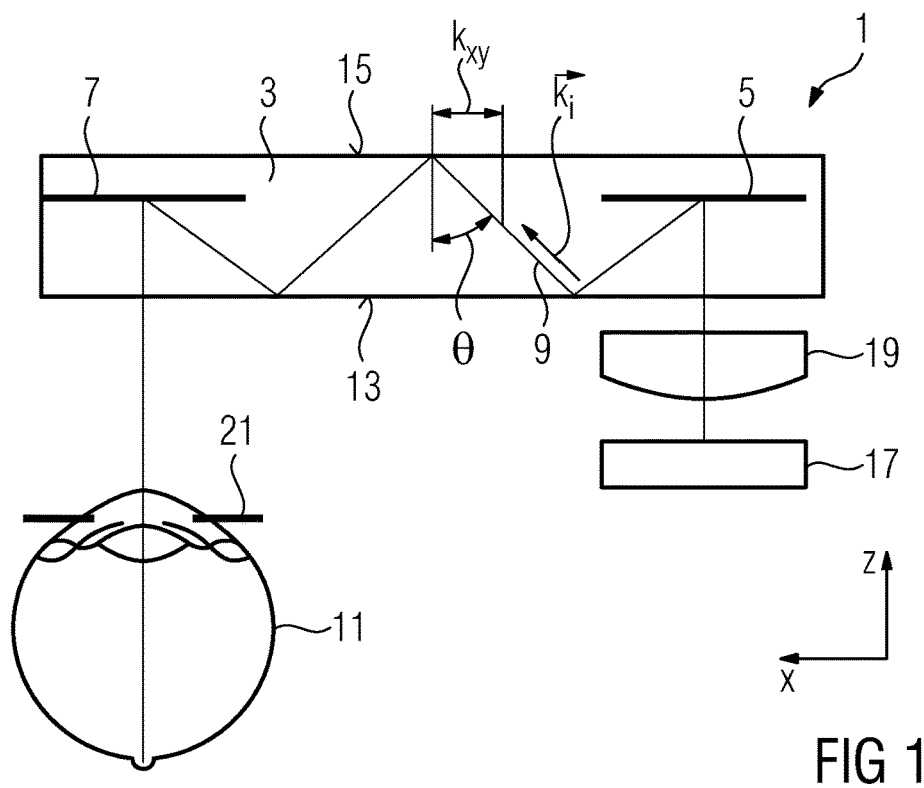
FIG. 1 shows a schematic illustration of an HMD.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Before the present invention is explained in more detail, the basic principles of a light guide for an HMD will be discussed below with reference to FIGS. 1 to 12.

FIG. 1 shows an HMD in a schematic view from above, i.e. seen from a position above the head. The HMD 1 comprises a light guide 3, in which an input coupling structure 5 and an output coupling structure 7 are embedded. Diffractive input coupling and output coupling structures are used in the present exemplary embodiment, although reflective input coupling and output coupling structures can also be used.

With the aid of the input coupling structure 5, light rays are coupled into the light guide, which are shown schematically in FIG. 1 with the reference sign 9. In the light guide 3, the light rays are guided to the output coupling structure 17 using total internal reflections at an inner surface facing the eye 11 of a user who is wearing the HMD and at an outer surface facing away from the eye 11. The light rays are finally coupled out of the light guide in the direction of the eye 11 by the output coupling structure.

The starting point of the light rays guided through the light guide is an initial image represented on a display 17, the pixels of which each emit divergent beams that, in the example shown, are collimated by an imaging optical unit 19 arranged between the display 17 and the input coupling structure 5 and are coupled into the light guide as collimated beams.

Where reference is made to reflected light rays in the light guide, this is understood to mean the light rays of the coupled-in beams, wherein the beams are each represented in the figures by their chief ray. The term chief ray here denotes the central ray of a beam. The direction of the chief ray indicates here the direction of the beam. In the case of a collimated beam, the remaining rays of the beam travel substantially parallel to the chief ray, and the chief ray is therefore representative of the rays of a beam. In the case of a non-collimated beam, the rays of the beam enclose a defined solid angle, at the center of which the chief ray travels.

All of the beams transmitted by the imaging apparatus, which is formed from the light guide 3 and the imaging optical unit 19, pass through the entrance pupil and the exit pupil of said imaging apparatus. The entrance pupil is formed by the aperture stop of the imaging apparatus or by an image of the aperture stop produced by imaging optical elements that are located in front of the aperture stop. In the present, schematic exemplary embodiment, the aperture stop is represented by the opening of the schematically shown lens element 19. The exit pupil is the image of the aperture stop formed by the imaging optical elements that follow the aperture stop. The imaging optical elements are arranged and formed in an HMD such that the exit pupil is located at the location at which the eye pupil is located when the HMD is worn on the head. The exit pupil is identified in FIG. 1 by reference sign 21.

In the case of HMDs, the eyebox is a variable that is often described, wherein the three-dimensional region of the beams in which the eye pupil can move without vignetting of the image is referred to as the eyebox. Since the distance of the eye from the light guide is substantially constant in the case of an HMD, the eyebox can, however, be reduced to a two-dimensional area which only takes into account the rotational movements of the eye. This reduced eyebox substantially corresponds to the exit pupil of the HMD. Therefore, only the exit pupil 21 is considered within the framework of the present description.

Diffraction gratings are used in the present exemplary embodiment as input coupling structure 5 and output coupling structure 7. The light rays are here coupled into and out of the spectacle lens via the first-order diffraction maximum, while the observation light passes through the input coupling structure and the output coupling structure as unimpaired as possible via the zero-order diffraction maximum. In principle, however, other orders of diffraction can also be used rather than the first order of diffraction for coupling in and out. Rather than the diffraction grating, it is also possible to use inclined, partially reflected mirrors or reflective Fresnel structures so that the input and output coupling takes place by reflection rather than by diffraction.

Figure 2:
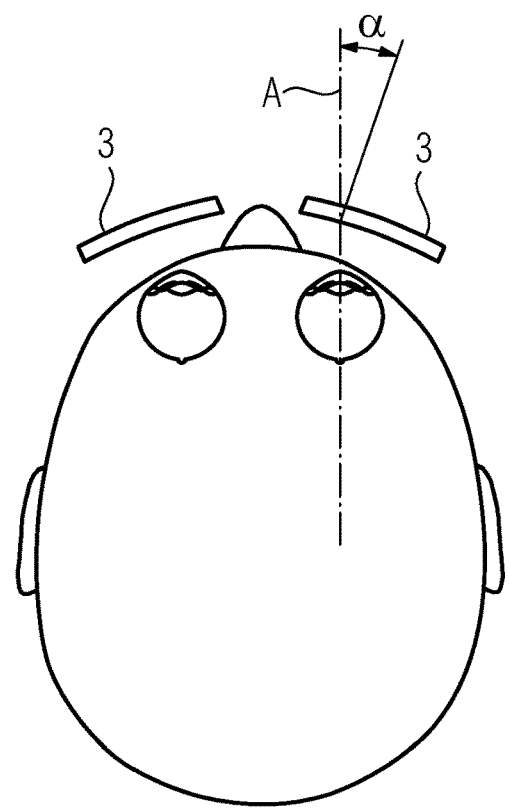
FIG. 2 shows the lateral angle of inclination of a spectacle lens.

An HMD, as is shown schematically in FIG. 1, can in particular be implemented in the form of smartglasses. The light guide 3 of the HMD 1 from FIG. 1 is then designed as a spectacle lens. Such an HMD is shown schematically in FIGS. 2 and 3, which, for the sake of clarity, show only the spectacle lenses of the smartglasses, that is to say the light guides 3. FIG. 2 here illustrates the lateral angle of inclination α of a spectacle lens with respect to the main visual axis A of the right eye. For an esthetically pleasing impression, each spectacle lens 3 is inclined to the respective side in the direction of the ears. The angle of inclination is referred to as the face form angle or wrap angle and is preferably selected to lie in a range from 5° to 20°, wherein spectacles viewed as sporty have rather larger face form angles than other spectacles. In the exemplary embodiments shown in the context of this description, a face form angle of 12° has been selected.

Figure 3:
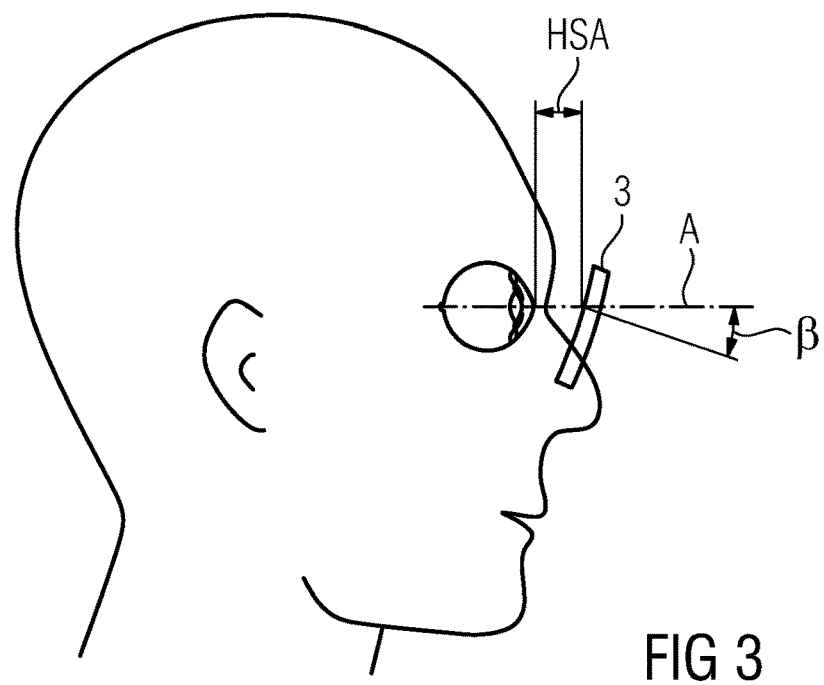
FIG. 3 shows the pantoscopic angle of a spectacle lens.

FIG. 3 shows the horizontal angle of inclination β of the spectacle lens 3 with respect to the main visual axis A of the right eye. For an esthetically pleasing impression, each spectacle lens 3 is slightly inclined downward. This angle is also referred to as a pantoscopic angle and is preferably selected to lie in a range from 5° to 20°, wherein glasses viewed as sporty have rather larger angles. In the exemplary embodiments presented in the context of this description, the pantoscopic angle is 8°.

In addition, spectacle lenses are generally designed for a certain distance between their rear surface, that is to say the inner surface 13 of the light guide 3, and the cornea. This distance, which is called the corneal vertex distance (referred to as HSA in FIG. 3) and is measured along the main visual axis A, should be more than 10 mm, preferably about 15 mm, so that the eyelashes do not touch the spectacle lens 3. On the other hand, too large a distance of more than 20 mm is perceived as unappealing and is therefore not preferred. In the exemplary embodiments presented in the present description, the corneal vertex distance is 15 mm.

In the context of the present invention, a coordinate system as shown in FIG. 1 is given. In this coordinate system, the z-axis extends in the viewing direction, and the x-axis extends from temporal to nasal, which substantially corresponds to the horizontal direction when an eye is looking straight ahead. The y-axis in FIG. 1 projects out of the image plane and thus points substantially vertically upward in the case of an eye that is looking straight ahead. Because the x-direction is defined from temporal to nasal and the y-direction projects out of the plane of the sheet, a right-handed coordinate system is obtained in the case of a light guide for the right eye, as shown in FIG. 1. In the case of a light guide for the left eye, by contrast, a left-handed coordinate system is obtained in the case of an x-direction that extends from temporal to nasal and a y-direction that projects out of the plane of the sheet. However, the convention chosen has the advantage that the y-axis points in the same direction in both cases, which simplifies the following considerations.

The largest possible field angle should be transmitted with the light guide 1, so that large image fields can be represented with the HMD. From esthetic points of view, input coupling from the side is preferred to input coupling from above. So that a specific light ray can be transmitted, it must be incident on the input coupling structure in a way such that the ray that is reflected or diffracted by the input coupling structure in the light guide fulfills the condition for total internal reflection. In other words, when the reflected or diffracted ray is incident on the inner surface and the outer surface, it must in each case have an angle to the surface normal that is greater than the critical angle for total internal reflection. However, using the existing technologies for input coupling structures, only a certain angular range can be coupled in such that the condition for total internal reflection is fulfilled in the light guide. This angular range limits the field angle of an image that is to be coupled into the light guide. This in particular applies to the horizontal direction of the image. The limitation mentioned will be explained below with reference to FIG. 4.

For the following considerations, the guidance of the light rays in the light guide and also the coupling into the light guide and the coupling out of the light guide in k-space, i.e. in the space of the wave vectors, are considered. A wave vector in this case is a variable from wave optics and represents a vector that extends in the normal direction with respect to the wave front. The absolute value of the wave vector is obtained by dividing $2\pi$ by the wavelength $\lambda$ of the light. In geometric optics, the direction of the wave vector corresponds to the propagation direction of the light rays.

Figure 4:
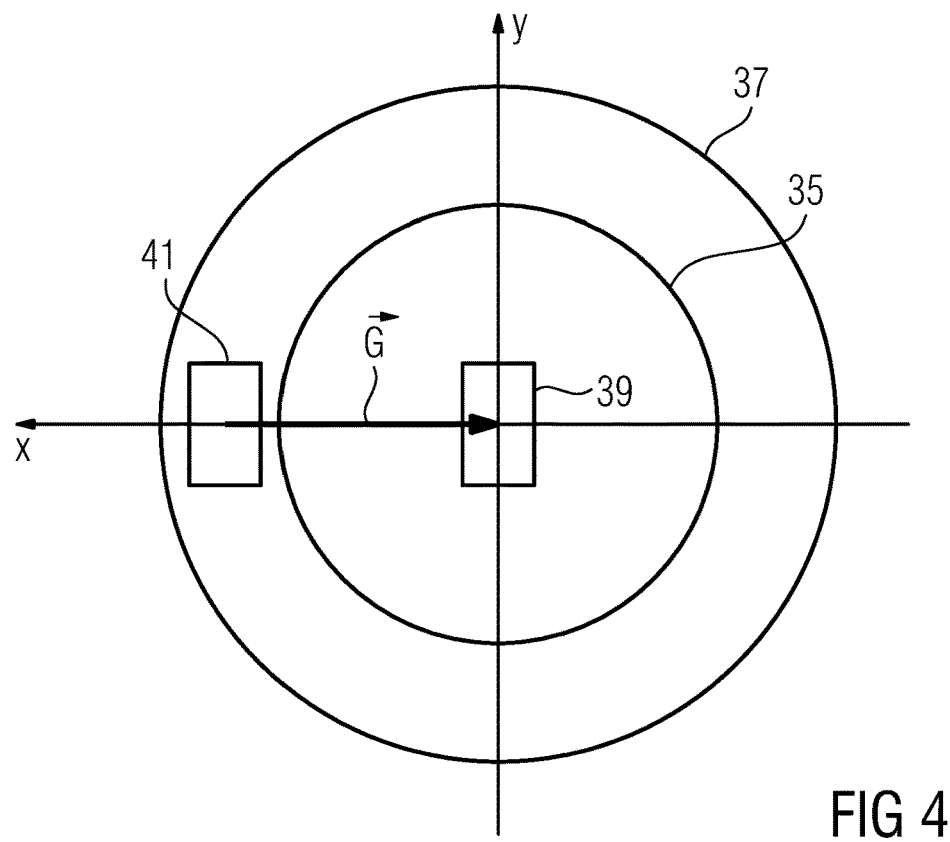
FIG. 4 shows a diagram for illustrating the wave vectors that are able to be transmitted in the light guide and the coupling out of light rays from the light guide.

FIG. 4 shows a Cartesian coordinate system in the wave vector space (hereinafter referred to as the k-space), the axes of which extend parallel to the coordinate system from FIG. 1. The value of the x-component $k_x$ of a wave vector k is plotted here along the x-axis, the value of the y-component $k_y$ of the wave vector k is plotted along the y-axis, and the z-component $k_z$ of the wave vector k would be plotted along the z-axis (not shown in FIG. 4). However, the projection $k_{xy}$ of the wave vector k into the xy-plane is of primary importance for the following considerations.

The condition for total reflection is that the angle of incidence onto an interface with an optically thinner medium exceeds a specific critical angle. The critical angle is given here by the equation $$\theta_G = \arcsin(n_2/n_1) \quad (1)$$

wherein $n_1$ is the refractive index of the light guide material and $n_2$ is the refractive index of the optically thinner medium adjacent to the light guide. With air as the optically thinner medium, as is the case for the inner surface 13 and the outer surface 15 of the light guide from FIG. 1, the value 1 can be used for $n_2$, so that equation (1) is simplified to $$\theta_G = \arcsin(1/n) \quad (2)$$

wherein n is the refractive index of the light guide material.

For a wave vector $k_a$ outside the light guide 3, its absolute value $k_a$ is given by the equation $$k_a = 2\pi/\lambda \quad (3)$$

wherein $\lambda$ is the wavelength of the light. When the light enters the light guide 1, the wave vector $k_a$ outside the light guide 3 changes to the wave vector $k_i$ inside the light guide 3 due to the refraction occurring when it enters. The absolute value $k_i$ of the wave vector $k_i$ in the light guide is obtained after multiplying the absolute value $k_a$ of the wave vector $k_a$ outside the light guide by the refractive index, so that $$k_i = n \times k_a. \quad (4)$$

For total internal reflection at the inner surface 13 or the outer surface 15 to take place, the angle of incidence $\theta$ light ray or the associated wave vector k onto the corresponding surface must be greater than the critical angle $\theta_G$ from equation (2). In the coordinate system used in FIG. 1, the condition for the occurrence of total internal reflection can be reformulated on the basis of the absolute value of the projection of the wave vector $k_i$ in the interior of the light guide 3 onto the xy-plane. The absolute value of the projection of the wave vector $k_i$ in the interior of the light guide 3 onto the xy-plane is given by $$k_{ixy} = k_i \times \sin\theta \quad (5)$$

For total internal reflection to occur, $\theta$ must be greater than the critical angle $\theta_G$ from equation (2), which is expressed by the condition $$\theta \geq \theta_G = \arcsin(1/n) \quad (6)$$

If condition (6) is inserted in equation (5), the condition for the occurrence of total internal reflection obtained for the absolute value of the projection $k_{ixy}$ of the wave vector k in the interior of the light guide onto the xy-plane is $$k_{ixy} \geq k_i \times 1/n. \quad (7)$$

If $k_i$ is now also replaced by $n \times k_a$ in accordance with equation (4), the following is obtained for the occurrence of total internal reflection $$k_{ixy} \geq k_a. \quad (8)$$

The projection of the wave vector k in the interior of the waveguide 3 onto the xy-plane must therefore, in terms of absolute value, correspond at least to the absolute value $k_a$ of the wave vector $k_a$ outside the light guide 3. On the other hand, the absolute value $k_{ixy}$ of the projection of the wave vector in the interior of the light guide 3 onto the xy-plane can at most correspond to the total amount $k_i$ of the wave vector $k_i$ in the interior of the light guide 3 (in this case, wave vector component $k_z=0$, so that the wave vector extends parallel to the interface, i.e. parallel to the inner surface 13 or to the outer surface 15). Total internal reflection thus always occurs when the absolute value $k_{ixy}$ of the projection of the wave vector k in the interior of the light guide onto the xy-plane lies between the absolute value $k_a$ of the wave vector $k_a$ outside the light guide and the absolute value $k_i$ of the wave vector $k_i$ inside the light guide. This is illustrated in FIG. 4.

FIG. 4 shows in the xy-plane of the k-space two circles (which are actually spherical sections of spheres in the three-dimensional coordinate system) centered around the origin of the coordinate system, i.e. around the z-axis, the radius of which in the case of the circle denoted by the reference sign 35 represents the absolute value $k_a$ of the wave vector $k_a$ outside the light guide and, in the case of the circle denoted by the reference sign 37, represents the absolute value $k_i$ of the wave vector k in the interior of the light guide 3.

All wave vectors $k_i$ that start from the origin of the coordinate system and have a projection $k_{xy}$ onto the xy-plane of the k-space that lies between the two circles 35 and 37 can be transmitted by the light guide 3. In order to make illustration in FIG. 4 independent of the wavelength, all wave vectors $k_a$ outside the light guide 3 are normalized to a unit length of 1 by multiplication by the factor $\lambda/2\pi$. The length of a wave vector in the interior of the light guide 3 is thus given by the refractive index n in the waveguide (cf. equation (4)). Thus, in the illustration shown in FIG. 4, the inner circle has the radius 1 and the outer circle has the radius n.

If an image field with a specific horizontal image field angle and a specific vertical image field angle is now coupled into the light guide 3, the wave vectors $k_a$ of the rays passing through the entrance pupil of the HMD 1 outside the light guide 3 mainly have a wave vector component $k_z$ and only small wave vector components $k_x$ and $k_y$. The set of the wave vector components $k_x$ and $k_y$ occurring can be regarded in this case as the angular spectrum of the rays passing through the entrance pupil of the HMD 1 (which represent the image shown on the display 17). This angular spectrum is shown in FIG. 4 at the reference sign 39. Owing to the input coupling structure 5 from FIG. 1, the angular spectrum 39 is reduced along the x-direction into the region, i.e. the wave vector component $k_z$ is reduced for the wave vector $k_i$ in the interior of the light guide 3 in favor of the wave vector component $k_x$, so that for the wave vector $k_i$ in the interior of the light guide 3, $k_x$ represents the essential wave vector component. The resulting angular spectrum in the interior of the light guide 3 is shown in FIG. 4 at the reference sign 41. In the case of diffractive input coupling as in the input coupling structure 5 from FIG. 1, the wave vector $k_i$ in the interior of the light guide is obtained from the wave vector $k_a$ outside the light guide according to the Laue condition $$k_a - k_i = G$$

from the grating vector G of the input coupling structure 5. The angular spectrum is thus shifted by the grating vector G by way of the input coupling structure. After the wave vectors $k_i$ have been transported through the light guide 3, they are coupled out of the light guide 3 again by the output coupling structure 7, wherein the output coupling structure 7 shown in FIG. 1 has a grating vector G'. The grating vector components $G'_x$ and $G'_y$ correspond here to the negative of the grating vector components $G_x$ and $G_y$ of the grating vector G of the input coupling structure 5, whereas the grating vector component $G'_z$ of the grating vector G' of the output coupling structure 7 corresponds to the grating vector component $G_z$ of the grating vector G of the input coupling structure 5. In this way, the angular spectrum 41 is shifted back to its original location, and the essential wave vector component of the coupled-out wave vectors is again the wave vector component $k_z$, but is rotated through 180° in comparison to the wave vector component $k_z$ before the coupling into the light guide 3, which in the present exemplary embodiment takes place through the side of the light guide facing the eye. If the input coupling takes place through the side facing away from the eye, the wave vector component $k_z$ also corresponds in its orientation to the wave vector component $k_z$ before the input coupling. The coupled-out angular spectrum substantially corresponds again to the angular spectrum shown at reference sign 39. The region of the angular spectrum shown at reference sign 39, which lies above the $k_x$ axis, contains wave vectors of light rays that the user of the HMD 1 perceives as coming from below, and the region which lies below the $k_x$ axis contains wave vectors of light rays that the user of the HMD 1 perceives as coming from above.

Figure 5:
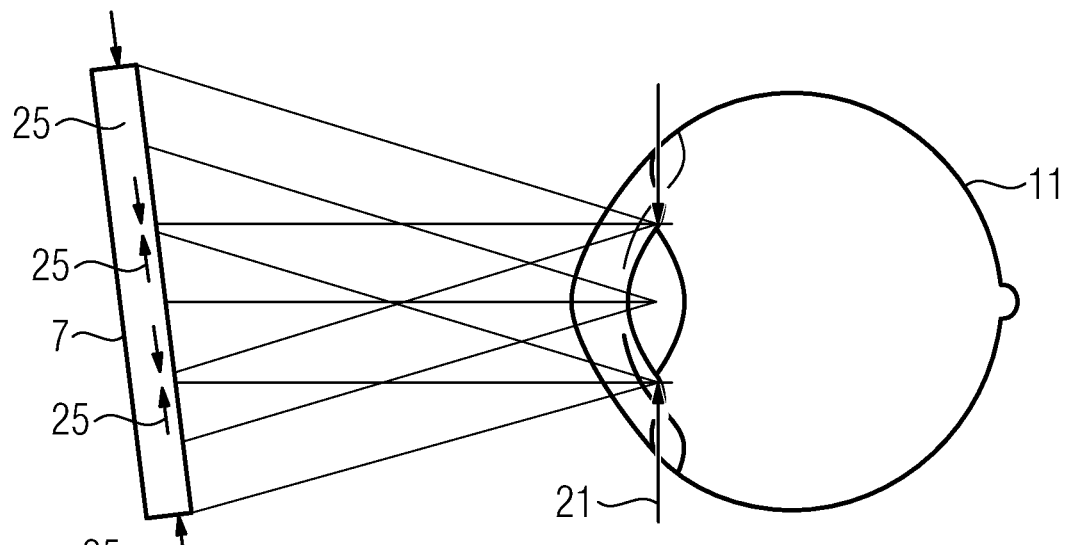
FIG. 5 shows the relationship between the eyebox and the output coupling region of a light guide.
Figure 6:
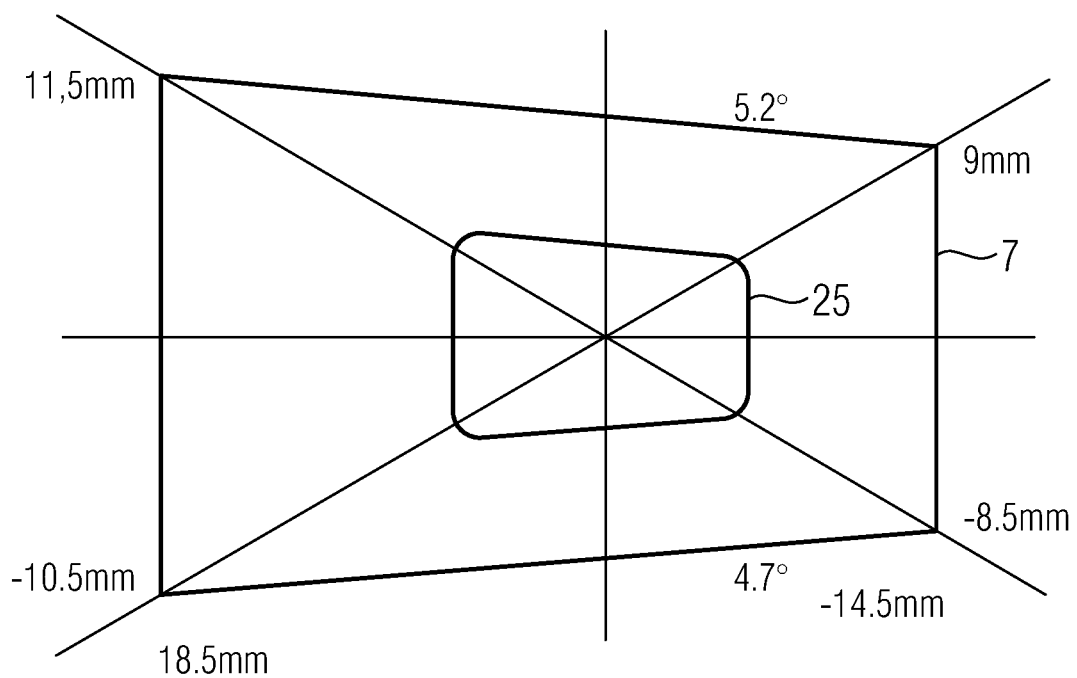
FIG. 6 shows a schematic illustration of an output coupling structure of a light guide and the projection of the eyebox onto the output coupling structure.

In order to make the angular spectrum that is transmittable by the light guide 3 visible to the user of the HMD 1, the output coupling structure must take up a specific area in the light guide 3. The area to be taken up in the light guide 3 results here from the projection of the exit pupil of the HMD 1 onto the plane of the output coupling structure 7 in the light guide 3 for all those angles at which the user of the HMD can view the transmitted image within the range of the transmitted angular spectrum. The periphery of the required output coupling region results here from the projection of the exit pupil onto the light guide along the maximum angles. FIGS. 5 and 6 show the extent of the output coupling structure in the light guide 3 thus ascertained, wherein the projection of the exit pupil onto the surface of the output coupling structure 7 is denoted with the reference sign 25. In FIG. 6, only the projection of the exit pupil 25 for a vertical and horizontal angle of 0° in each case is shown, and in FIG. 5, the projection of the exit pupil for the maximum positive and the maximum negative angle at which the image transmitted by the HMD 1 can still be captured is also shown. A horizontal and a vertical angle of 0° each represent rays which reach the eye, when the eye 11 is looking straight ahead, parallel to the visual axis of the eye 11. FIG. 6 shows a plan view of the area required for output coupling in the case of the right eye from the direction from which the eye looks at the light guide.

Figure 7:
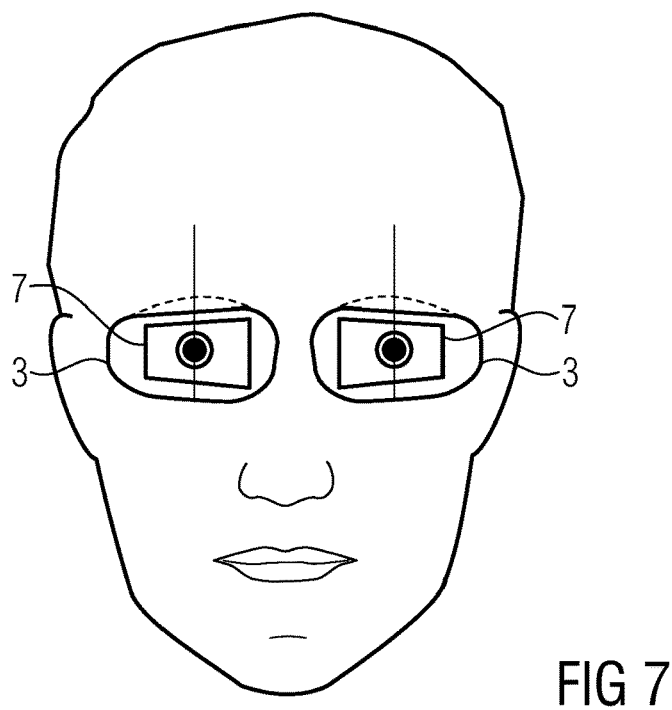
FIG. 7 shows the position of the output coupling structure in typical spectacle lenses.

The field angle, which corresponds to the area shown in FIG. 6, is 60° by 34° with a corneal vertex distance of 15 mm, a face form angle of 12°, and a pantoscopic angle of 8° in an almost flat light guide 3, for example a spectacle lens with a radius of curvature of greater than 150 mm. In the case of more strongly curved spectacle lenses, there are slight deviations from the area shown in FIG. 6. In order to be able to get a better picture of the size of the output coupling structure 7 thus ascertained in the light guide 3, FIG. 7 shows the extent of the output coupling structures, as determined in accordance with the description made with reference to FIGS. 5 and 6. It can be seen that the output coupling structures 7 take up a considerable region of the spectacle lens, i.e. of the light guide 3. The difficulty here is that the light in the spectacle lens, that is to say in the light guide 3, is to be guided from the side to the output coupling region. For negative angles, for example a negative angle of 17°, that is to say the light comes from above for the viewer, light must be coupled out of the upper section of the output coupling structure 7.

In the following text, the relationships of wave vector components with respect to one another will be considered rather than the angles. In the coordinate system described above, wave vectors with negative field angles are those wave vectors that have a ratio of $k_y/k_{xz} < 0$. Here, $k_y$ denotes the y-component of the wave vector $k$ and kxz denotes the absolute value of the projection of the wave vector onto the xz-plane. This absolute value of the projection onto the xz-plane is given by $k_{xz} = \sqrt{k_x^2 + k_z^2}$, where $k_x$ and $k_z$ represent the x- and z-components of the wave vector $k$. Ratios $k_y/k_{xz} > 0$ represent positive angles, which in the present case are angles that the viewer perceives as coming from below.

In the output coupling structures of the prior art, wave vectors having a negative ratio of $k_y$ to $k_{xz}$ must also have a negative ratio of $k_y$ to $k_{xz}$ in the light guide, only reduced by the refractive index difference according to Snell's law of refraction. In polycarbonate, for an angle outside the light guide of −17°, which corresponds to a ratio of $k_y$ to $k_{xz}$ of approximately −0.31, an angle of, for example, −10.6° is obtained in the light guide, which corresponds to a ratio of $k_y$ to $k_{xz}$ of approximately −0.19 (the ratio $k_y$ to $k_{xz}$ corresponds to the tangent of the angle of the wave vector k to the xz-plane, which substantially corresponds to the horizontal plane when the eye is looking straight ahead). Due to the non-linearity of the law of refraction, the actual ratio of $k_y$ to $k_{xz}$ in the interior of the light guide depends on the value of the x-component $k_x$ of the wave vector. A ratio of the ratio of $k_y$ to $k_{xz}$ of approximately −0.31 outside the light guide can therefore correspond to a ratio of $k_y$ to $k_{xz}$ of greater than or less than −0.19 in the interior of the light guide depending on the value of the x-component $k_x$ of the wave vector.

Figure 8:
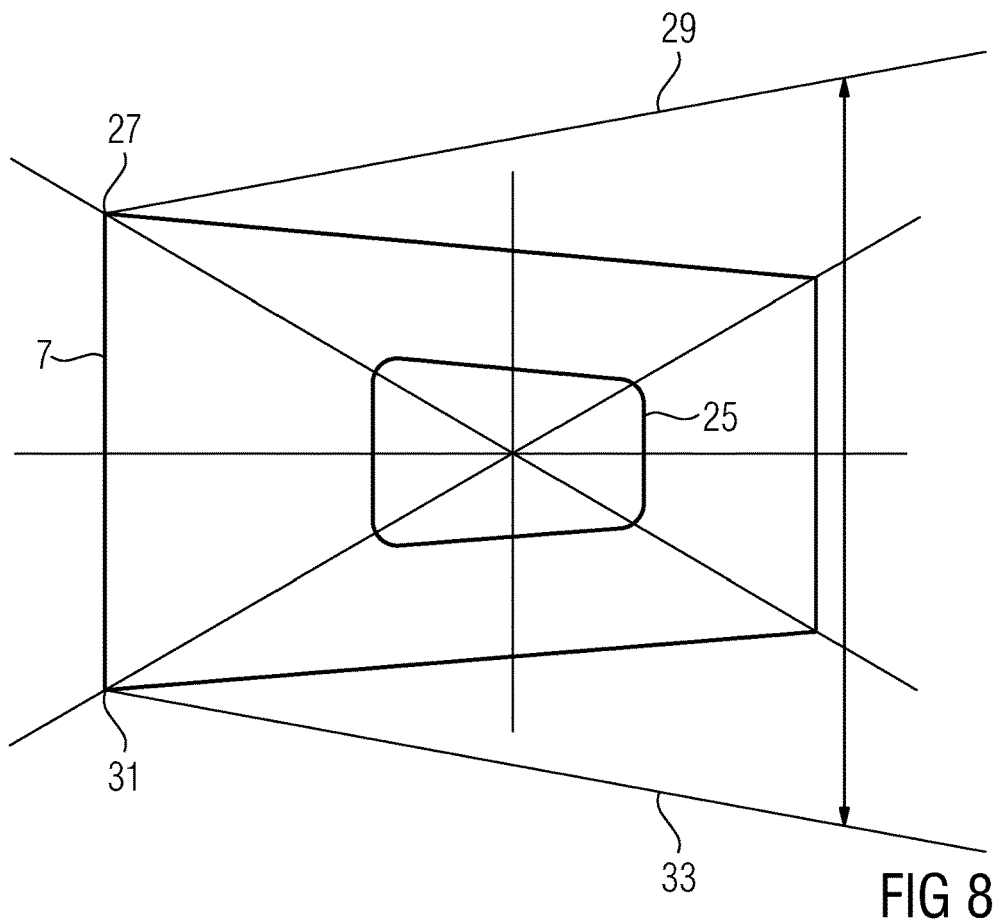
FIG. 8 shows the course of light rays to the output coupling structure in the light guide.

Since the wave vector of light with a negative angle of −17° must extend at an angle of −10.6° in the interior of a light guide 3 made from polycarbonate, a light guide embodied as a spectacle lens must widen toward the temple in the case of input coupling from the side for the light to be incident on the output coupling structure 7 "from above." This is shown schematically in FIG. 8. Light rays that are coupled out from the corner 27 of the output coupling structure 7 shown at the top left in FIG. 8 have a course in the light guide 3 that is represented by the line 29. Correspondingly, light rays representing an angle of +17° extend at an angle of +10.6° in the light guide 3. The course of a ray that is coupled out from the lower left corner of the output coupling structure at a vertical angle of +17° is denoted in FIG. 10 by line 33. As illustrated in FIG. 8, the light rays in the light guide diverge vertically as the distance from the output coupling structure increases. The consequence of this is that the extent of the light guide 3 in the y-direction, that is to say the vertical extent of the spectacle lenses in FIG. 7, would have to become greater and greater as the distance from the output coupling structure increases, which is difficult to achieve in the case of a spectacle lens without disturbing the esthetic overall impression of the spectacle lens. There is no space in the spectacle lenses 3 of FIG. 7 for the course of the rays with maximum negative and maximum positive vertical angles, represented by lines 29 and 33, that is rays with a maximum negative ratio of $k_y$ to $k_{xz}$ and a maximum positive ratio of $k_y$ to $k_{xz}$. While the spectacle lenses 3 could be enlarged in the region of the lower edge without adversely affecting the esthetic overall impression too much, an extension of the upper edge is generally associated with a considerable negative impact on the esthetic impression of the spectacle lenses 3. The present invention, on the other hand, enables the rays associated with the maximum negative angle and the maximum positive vertical angle to be guided in the light guide without enlarging the extension of the light guide in the y-direction (see FIG. 1), i.e. the vertical extension of the spectacle lenses in FIG. 7, that is such that an unesthetic overall impression is obtained.

In the present exemplary embodiment, the invention is realized in that the grating vector G of a diffractive output coupling structure 7 encloses an angle φ with the x-axis of the k-space. The angular spectrum 41 in the interior of the light guide 3 is shifted to positive values of $k_y$ by this angle φ, which in the present exemplary embodiment has a value of 11°. In the present exemplary embodiment, the shift is effected until only positive values of $k_y$ occur in the interior of the light guide 3. As a result, the ratio of $k_y$ to the absolute value $k_{xz}$ of the projection of the wave vector onto the xz-plane in the interior of the light guide 3 is always positive. Since this ratio corresponds to the tangent of the angle of the wave vector to the xz-plane, this means that only positive angles to the xz-plane occur in the interior of the light guide 3 and thus that no light ray reaches the output coupling structure from above, which would correspond to a negative angle and a negative value of $k_y$. The upper edge of the spectacle lens therefore need not extend above the upper edge of the output coupling structure 7. It should be noted at this point that it does not necessarily have to be the case that there are no negative values for $k_y$ at all, but merely that the negative values for $k_y$ are reduced to such an extent that no unsightly raising of the upper edge of the spectacle lens is necessary in order to allow the transmission of the entire angular spectrum 39.

Figure 9:
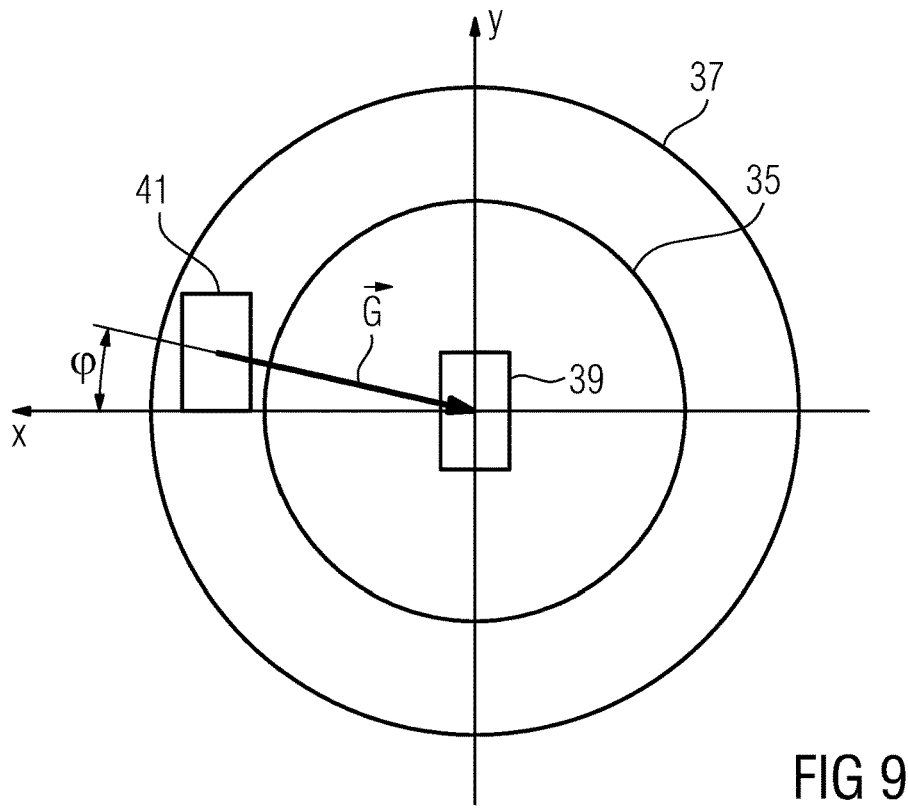
FIG. 9 uses a diagram to show a first example for the transmission of wave vectors in the light guide according to the invention and for coupling light rays into and out of the light guide.
Figure 10:
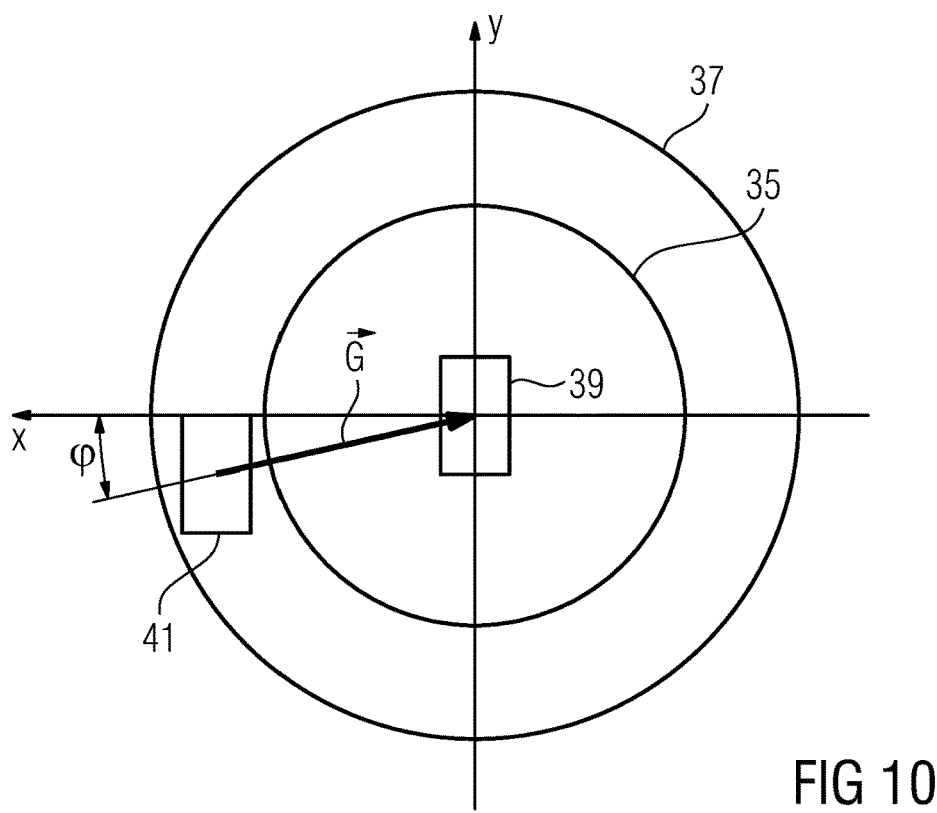
FIG. 10 uses a diagram to show a second example for the transmission of wave vectors in the light guide according to the invention and for coupling light rays into and out of the light guide.

However, the shift of the angular spectrum 41 shown in FIG. 9 in the interior of the light guide 3 can lead to an enlargement of a spectacle lens such that the lower edge in FIG. 7 has to move further downward. As already mentioned, this creates fewer esthetic problems than moving the upper edge of the spectacle lens further up. In general, however, the angular spectrum 41 can also be shifted to negative values of $k_y$ rather than to positive values of $k_y$, for example if the lower edge of the spectacle lens represents an edge that cannot be moved and an enlargement of the spectacle lens in the region of the upper edge is unproblematic. In this case, the amount of wave vectors that are incident on the output coupling structure 7 from below is reduced, and possibly no more wave vectors at all are incident on the output coupling structure 7 from below. This variant is shown in FIG. 10. In the variant shown in FIG. 10, the grating vector G is rotated through an angle φ, the value of which in the present example is −11° to the x-axis of the k-space. Of course, other negative values for the angle φ are also possible, depending on how far the angular spectrum 41 in the interior of the light guide 3 is to be shifted to negative values of $k_y$.

Figure 11:
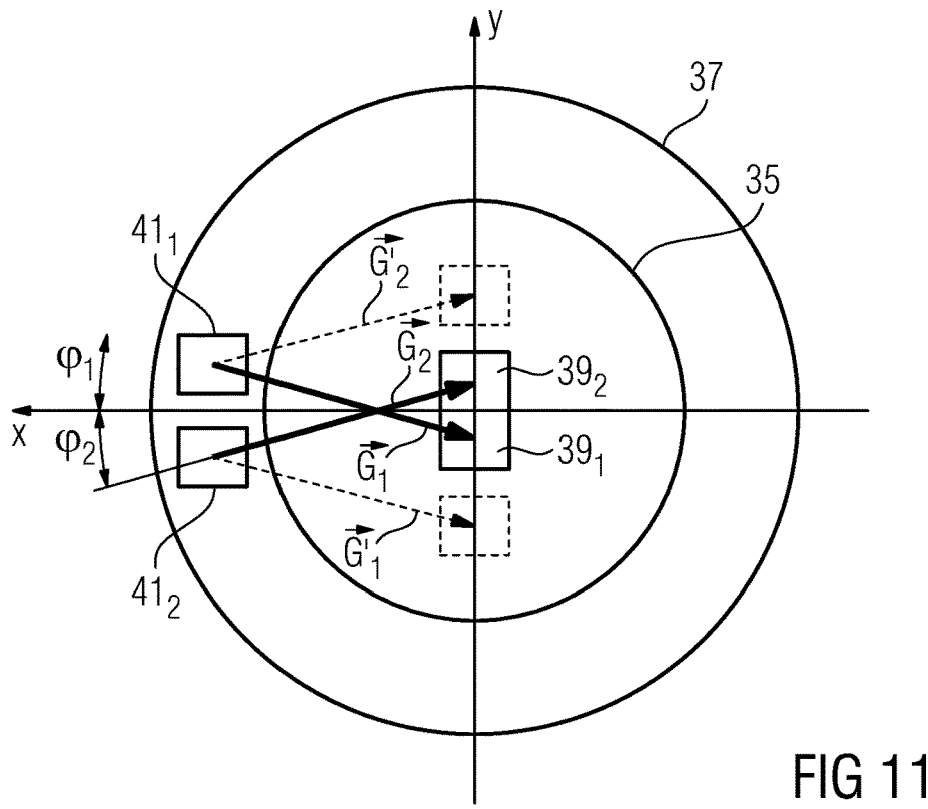
FIG. 11 uses a diagram to show a third example for the transmission of wave vectors in the light guide according to the invention and for coupling light rays into and out of the light guide.

Within the scope of the invention, it is also possible for the output coupling structure 7 to be divided in two horizontally, for example in such a way that the upper section of the output coupling structure 7 only couples out wave vectors that have negative values of $k_y$ or $k_y=0$ after the output coupling and the lower section only couples out wave vectors that have positive values of $k_y$ after the output coupling. The rays coupled out from the upper section of the output coupling structure then form that part of the angular spectrum 39 that lies below the x-axis in FIG. 4, and the wave vectors coupled out from the lower section of the output coupling structure form that part of the angular spectrum 39 that lies above the x-axis in FIG. 4. As shown in FIG. 11, the grating vector $G_1$ of the upper section of the output coupling structure 7 can be selected such that that part of the angular spectrum $39_1$ which lies below the x-axis in the k-space completely lies above the x-axis (reference number $41_1$) in the interior of the light guide 3 in the k-space, and the grating vector $G_2$ of the lower section of the output coupling structure 7 can be selected such that that part of the angular spectrum $39_2$ which lies above the x-axis in the k-space completely lies below the x-axis (reference sign $41_2$) in the interior of the light guide 3 in the k-space. That means that the upper section of the output coupling structure 7 in the interior of the light guide is supplied with the wave vectors from below and the lower section of the output coupling structure 7 is supplied from above. In other words, the wave vectors supplied to the lower section and to the upper section of the output coupling structure 7 extend crosswise in the interior of the light guide 3. As a result, the vertical extent of the light guide 3 or of a spectacle lens that is formed by the light guide can be kept low. In the representation of the initial image on the display of an HMD equipped with such a spectacle lens, the upper and the lower part of the image field need to be swapped accordingly. If a part of a beam that is represented by a wave vector is incident on the wrong section of the output coupling structure 7, it is coupled out, as indicated by the dashed grating vectors $G'_1$ and $G'_2$ and the dashed angle spectra $41'_1$ and $41'_2$ in FIG. 11, such that they have a very large or a very small value of $k_y$. With a suitable choice of the grating vectors, it can be ensured that the misguided parts of the angular spectrum are so far away from the xz-plane that they do not pass into the exit pupil of the HMD and thus no undesired double images occur.

In the case of the output coupling structure 7 that is divided in two vertically, there is also an input coupling structure 5 that is divided in two vertically, wherein the sections of the input coupling structure 5 are in each case assigned to the sections of the output coupling structure 7 in such a way that the rays coupled in by the respective input coupling structures 5 are in each case coupled out substantially only by one of the output coupling structures 7. The problem of a possible overlap of coupled-in beams with the wrong part of the output coupling structure 7 can be solved as described with reference to FIG. 11.

Figure 12:
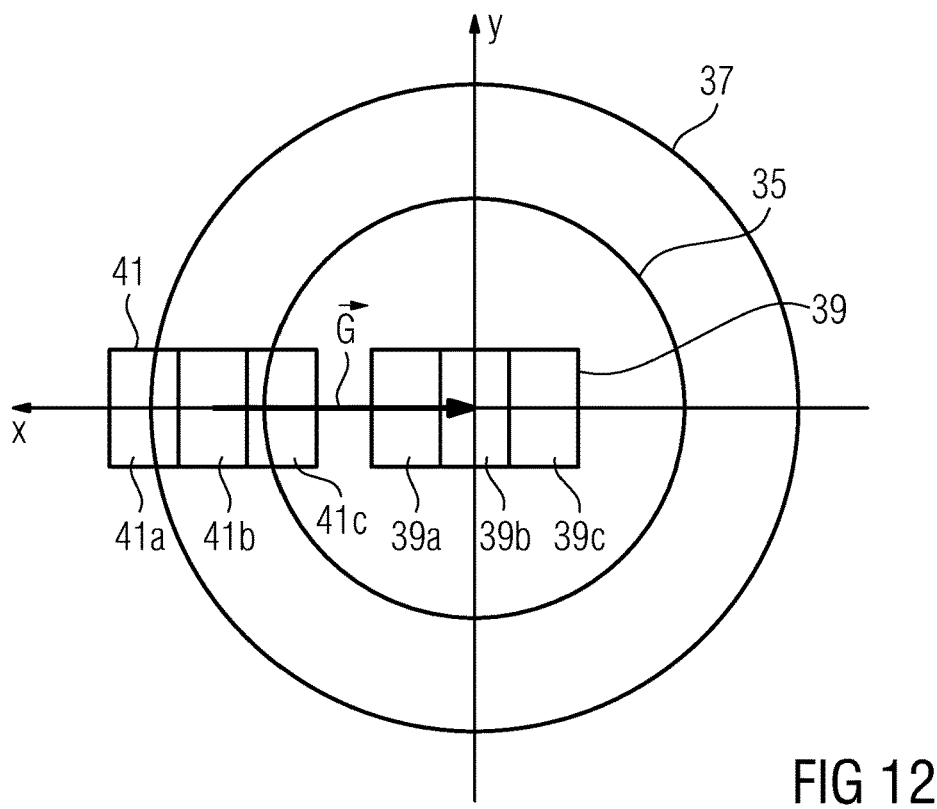
FIG. 12 uses a diagram to show the division of an angular spectrum in the case of field stitching.

In the embodiment variants described so far, the horizontal field angles of the transmitted angular spectrum are small enough that the angular spectrum 41 with all its values for the x-component $k_x$ of the wave vector k lies in the interior of the light guide 3 between the two circles denoted by the reference signs 35 and 37, i.e. that the angular spectrum 39 with all its components $k_x$ can be transmitted. In particular in the case of large horizontal field angles, such as occur, for example, in images in the 16:9 format, the region in which values for $k_x$ can occur is however wider than the region between the circles 35 and 37. This situation is shown in FIG. 12. The angular spectrum resulting from the field angle is shown divided into three parts in FIG. 12 (parts 39*a*, 39*b* and 39*c*), wherein part 39*b* corresponds to an angular spectrum as shown in FIG. 4. Those parts (39*a*, 39*c*) of the angular spectrum 39 that are shown in FIG. 12 to the left and right of the central part 39*b* of the angular spectrum 39 can no longer be transmitted completely by way of total internal reflection of the light guide 3 since they are not located completely within the two circles 35 and 37 after the input coupling.

Figure 13:
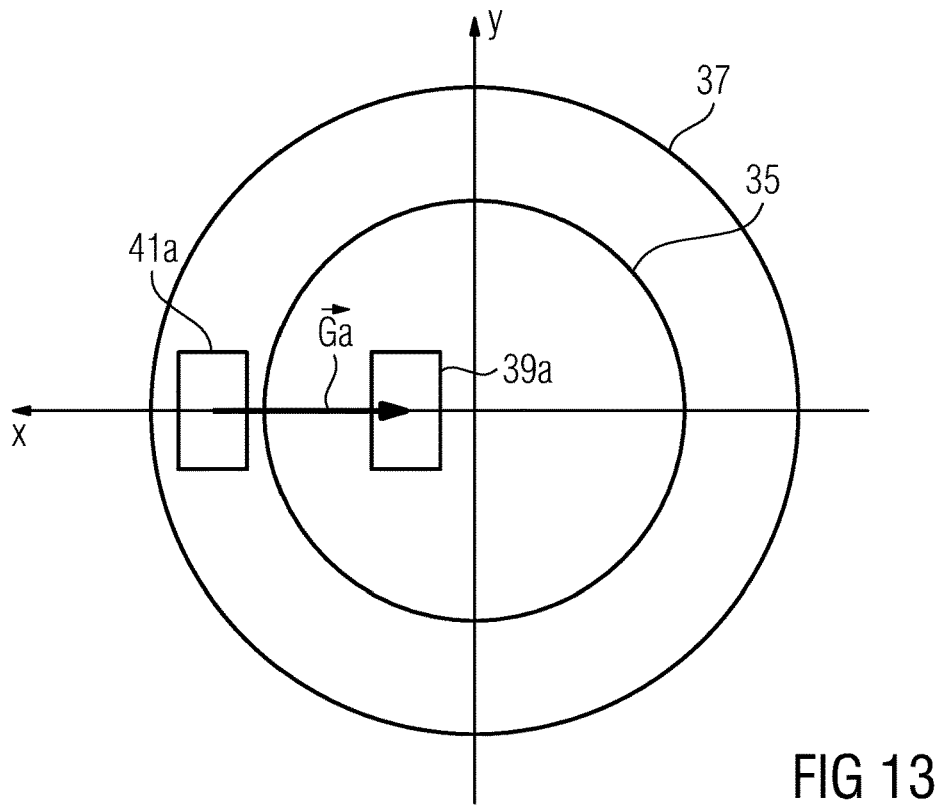
FIG. 13 uses the diagram of FIG. 11 to show a first part of the angular spectrum for illustrating its transmission and its input and output coupling.
Figure 14:
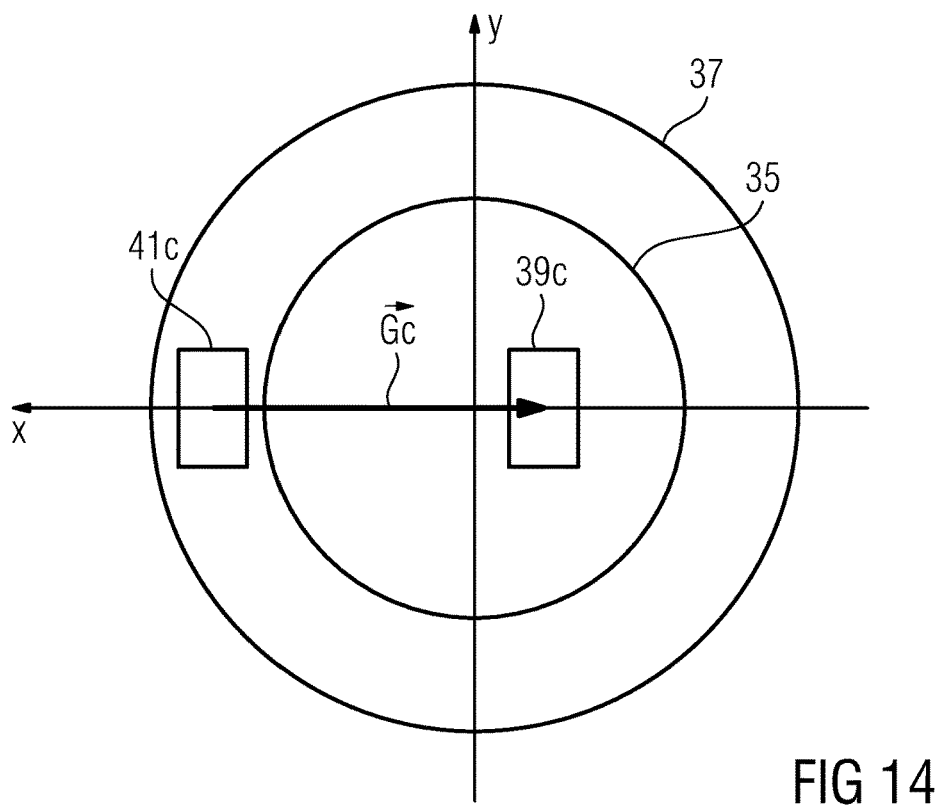
FIG. 14 uses the diagram of FIG. 11 to show a second part of the angular spectrum for illustrating its transmission and its input and output coupling.

In order nevertheless to be able to transmit images with a large field angle, in particular images with a large horizontal field angle, it is proposed in WO 2017/102795 A1, for example, to equip an HMD with a plurality of image generators $17_1$, $17_2$, $17_3$ or a plurality of image generator sections of a single image generator and to use in each case for each partial image field in the light guide 3 shown on one of the image generators $17_1$, $17_2$, $17_3$ or image generator sections, a separate subsidiary light guide $3_1$, $3_2$, $3_3$ (see FIG. 15), wherein each subsidiary light guide $3_1$, $3_2$, $3_3$ has its own input coupling structure $5_1$, $5_2$, $5_3$ and its own output coupling structure $7_1$, $7_2$, $7_3$. The individual input coupling structures $5_1$, $5_2$, $5_3$ and the individual output coupling structures $7_1$, $7_2$, $7_3$ are each designed for the same field angles, but optimized for light rays from different directions of incidence. For example, in the case of an image format with a horizontal field angle of 60°, each image generator $17_1$, $17_2$, $17_3$ or image generator section can be designed such that it shows a partial image with a field angle of 20°, and the subsidiary light guides $3_1$, $3_2$, $3_3$ can be designed such that they each transmit a horizontal field angle of 20°, but wherein the field angles are each centered around a different central angle. In the case of diffractive input and output coupling, this is achieved by the suitable selection of the respective grating vector, as is shown in FIGS. 13 and 14. In the present example, the grating vectors $G_a$ of the input coupling structure $5_1$ and the output coupling structure $7_1$ are designed such that the horizontal field angle coupled in or out thereby is centered around a horizontal angle of −20° (corresponds to the case shown in FIG. 14). The grating vectors of the input coupling structure $5_2$ and the output coupling structure $7_2$ are then designed such that the horizontal field angle they couple in or out is centered around a horizontal angle of 0° (corresponds to the case shown in FIG. 4). Finally, the grating vectors $G_c$ of the input coupling structure $5_3$ and the output coupling structure $7_3$ are designed such that the horizontal field angle that is coupled in or out thereby is centered around a horizontal angle of +20° (corresponds to the case shown in FIG. 13). Overall, the three subsidiary light guides $3_1$, $3_2$ and $3_3$ thus transmit a field angle of 60° in the range from −30° to +30°, wherein the original field angle of 60° was divided into three field angles of 20° each (−30° to −10°, =10° to +10° and +10° to +30°), which are each transmitted separately from each other through the different light guides $1_1$, $1_2$ and $1_3$. In a similar manner, it is also possible in principle to divide a vertical field angle into a number of partial regions, which are transmitted separately from one another. The procedure described is also known by the term "field stitching."

The field angle of 60° and the division into field angles of 20° each have only been used here to better illustrate the concept of "field stitching." Field angles other than the field angle of 60° and a different division of the field angle than into field angles of 20° in each case are of course possible, including those divisions in which the field angle is divided unevenly (e.g. division of a field angle of 50° into field angles of −30° to −20°, −20° to +10°, +10° to +20°, i.e. into field angles of 10°, 30° and again 10°).

Figure 15:
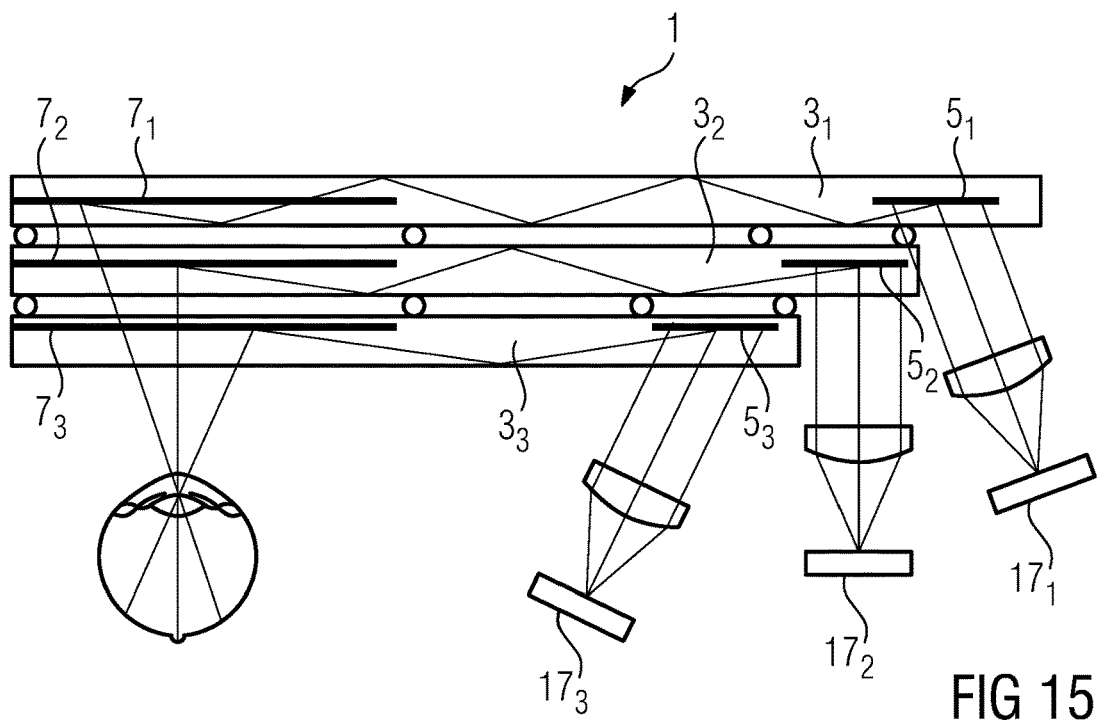
FIG. 15 shows a light guide with three subsidiary light guides, which each transmit a different part of the angular spectrum.

While in FIG. 15, as in FIG. 1, input and output coupling are effected with the aid of diffraction gratings, it is also possible to couple in and out by way of differently inclined, partially transmissive mirrors. In particular, the partially transmissive mirrors can then be designed in such a way that they are partially reflecting for specific angles of incidence, but completely transparent for all other angles of incidence.

With the aid of the field stitching described, it is possible with diffractive output coupling and triple field stitching, as has been described with reference to FIG. 15, to attain an image field of 60°×34° (corresponds to an image format of 16:9), which corresponds to a diagonal image field of up to 70°. In an embodiment with splitter mirrors, about 47°× 26.5° can be achieved without field stitching, which corresponds to a diagonal of 54°. A larger image field with a diagonal of approximately 70° requires double field stitching.

With reference to FIGS. 12 to 15, it was assumed that a separate light guide $3_1$, $3_2$, $3_3$ is used for each part of the angular spectrum 39*a*, 39*b*, 39*c*. Moreover, however, the present invention includes embodiment variants in which at least two parts of the angular spectrum 39*a*, 39*b*, 39*c* are transmitted together by a single light guide 3. These embodiment variants are characterized by a smaller number of light guides stacked on top of each other and make particularly thin and esthetic spectacle lenses for HMDs in the form of smartglasses possible. This approach is linked to the additional boundary condition that the user of smartglasses does not perceive ghost images that arise from crosstalk between the parts of the angular spectrum 39*a*, 39*b*, 39*c* that are transmitted together in a light guide. In the following text, it is to be assumed that ghost images arise when the beams or the image information of a part of the angular spectrum 39*a*, 39*b*, 39*c* on a decoupling element provided for another part of the angular spectrum 39*a*, 39*b*, 39*c*. Ghost images bother the user when the rays linked to the ghost images reach the exit pupil or the eyebox and are thus focused on the retina for permissible pupil positions. This effect can be avoided in different ways.

First, the individual parts of the angular spectrum 39*a*, 39*b*, 39*c* can be spatially guided such that the light rays of a part of the angular spectrum 39*a*, 39*b*, 39*c* are not incident on the output coupling structure that is assigned to another part of the angular spectrum 39*a*, 39*b*, 39*c*.

Secondly, it is possible to design the output coupling structures (gratings, wavelength-selective volume holograms or the dichroic mirrors) in such a way that they are insensitive to rays from an incorrect part of the angular spectrum 39*a*, 39*b*, 39*c*. In this case, the rays of the wrong part of the angular spectrum 39*a*, 39*b*, 39*c* continue to propagate in the light guide and are not coupled out. A special form of this approach are combinations of an angular spectrum within the waveguide and grating vectors that shift the angular spectrum to the region in the xy-plane of the k-space in which propagation in the waveguide would not take place, for example in a region outside the outer circle 37.

Thirdly, the optical arrangement can be designed such that the rays of a part of the angular spectrum 39*a*, 39*b*, 39*c* that is incorrectly coupled out by an output coupling structure are deflected in such a way that they miss the exit pupil or the eyebox. Such a procedure was described with reference to FIG. 11 for dividing the angular spectrum into a part above the x-axis and a part below the x-axis.

Figure 16:
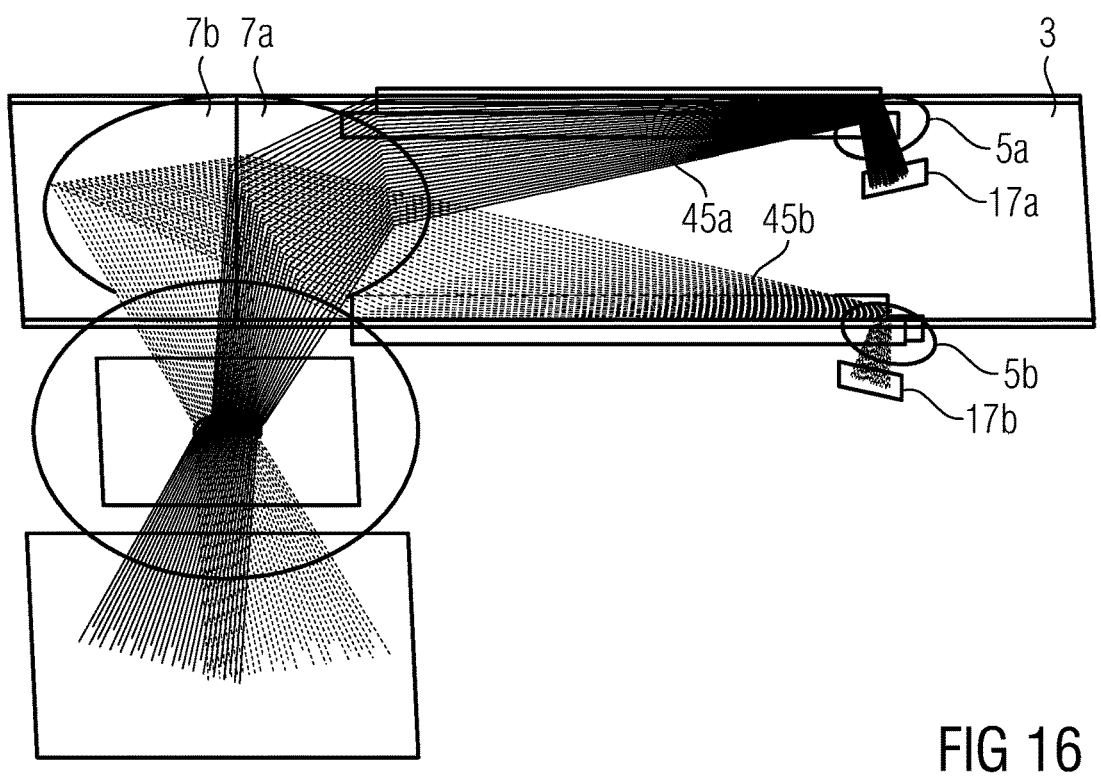
FIG. 16 shows the common transmission of light rays that have been coupled into the same light guide by different input coupling elements and represent different parts of the angular spectrum.

An example of double field stitching, in which the total angular spectrum is transmitted via a single light guide 3, is shown in FIG. 16. The input and output coupling gratings 5a, 7a that are assigned to the rays 45a of one part of the angular spectrum each have the same orientation, have the same grating period and each use the opposite order of diffraction (for example first order for coupling in and minus first order for coupling out). Likewise, the input and output coupling gratings 5b, 7b that are assigned to the rays 45b of the other part of the angular spectrum each have the same orientation, have the same grating period and each use the opposite order of diffraction (for example first order for coupling in and minus first order for coupling out). The chief rays of the two beams 45a, 45b that are coupled in by the input coupling gratings 5a, 5b are each rotated through +10° or −10° with respect to the normal of the input coupling surface and have different grating periods in order to optimally guide the beams 45a, 45b, which are inclined with respect to one another, in each case in the light guide 3. Each beam 45a, 45n here starts from its own display 17a, 17b.

In order to enable pupil expansion also in the vertical direction, it is possible to provide a third optical element, for example a third grating, between the input coupling and output coupling structures 5a, 5b, 7a, 7b, the orientation of which is obtained from the orientation of the input coupling structure and the output coupling structure. Different orientations of the input coupling and output coupling structures are also conceivable when using deflection elements 46a, 47b at the periphery of the spectacle lens.

Figure 17:
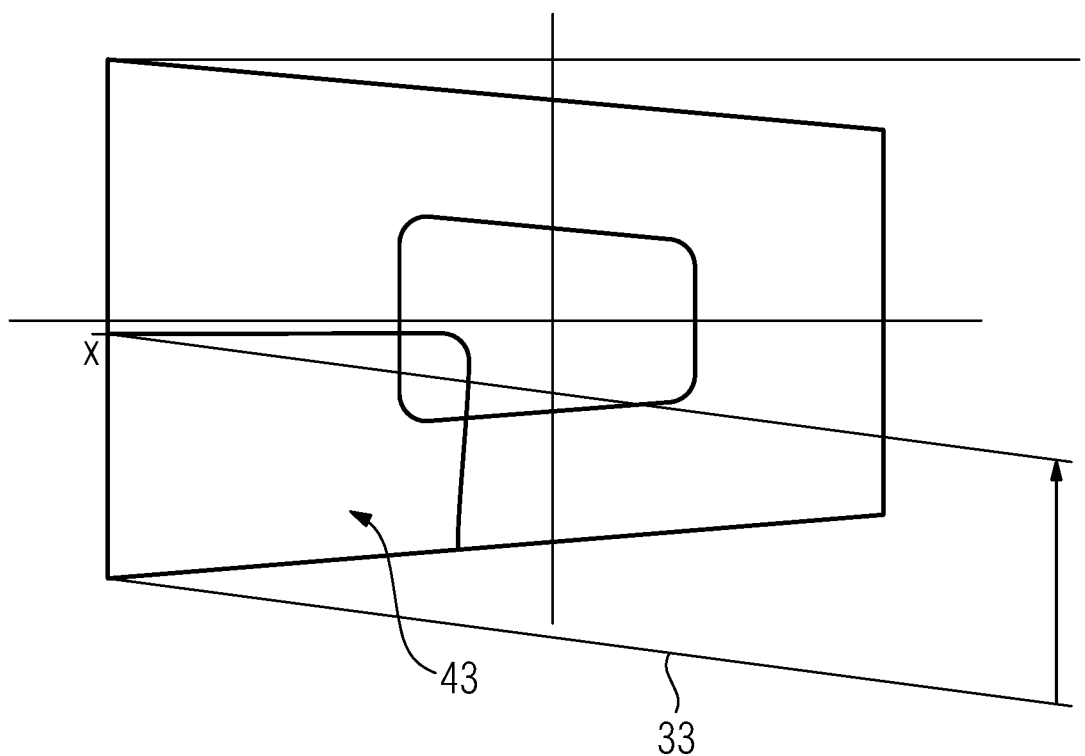
FIG. 17 shows a region that is blocked in the exit pupil.

In addition to the already described embodiment variants of the invention, further embodiment variants are conceivable. For example, it is conceivable to trim the exit pupil (strictly speaking, the eyebox) for specific angles. If a person were to look to the left, for example, those angles that relate to light rays that are perceived from the bottom left can be hidden for the right eye. When looking to the left, such light rays are typically obscured by the nose, so that it is not a problem to also trim the virtual image generated with the HMD accordingly. The user of the HMD then has the impression that the virtual image is also obstructed by the nose. Such a region 43, which can be omitted, is shown schematically in FIG. 17. By omitting this region 43, in particular those parts of the angular spectrum that, for example, in FIG. 4 lie in the right corner of the angular spectrum denoted by reference sign 39 can be omitted. The line 33 from FIG. 8 thereby moves upward, so that a smaller vertical extent of the spectacle lens is made possible.

All of the principles described in the context of the invention can also be applied to the case that the input coupling does not take place in the region of the temple (i.e. primarily with a horizontal light guidance to the eye) but in the region of the forehead (primarily vertical light guidance to the eye). Furthermore, the invention does not only include approaches in which the output coupling structures for the individual channels sharply adjoin one another.

The present invention has been described in detail on the basis of exemplary embodiments for explanatory purposes. However, it is clear to a person skilled in the art that features of the described exemplary embodiments can be combined with features of other exemplary embodiments within the scope of the invention and that it is possible to deviate from the exemplary embodiments within the scope of the invention.

For example, the output coupling structures or output coupling structure regions that are assigned to the individual parts of the angular spectrum can also overlap in a pattern, for example in the form of a chessboard pattern, in the form of pie pieces, etc. It is also possible to use multiplexed volume holograms (multiple exposure of a hologram with different functions) or to lay a plurality of thin volume hologram layers on top of one another, wherein each layer is assigned to a different channel. In addition, individual light guides and/or individual input coupling and output coupling elements can also be used to transmit different wavelengths rather than to transmit different parts of the angular spectrum. In particular, it is possible to use both individual light guides and/or individual input coupling and output coupling elements for different parts of the angular spectrum and to use in turn individual light guides for each part of the angular spectrum and/or to use individual input coupling and output coupling elements for different wavelength ranges. Therefore, the present invention is not intended to be limited by the exemplary embodiments but rather only by the appended claims.

The invention claimed is:

1. A light guide for guiding light for a head-mounted display (HMD), wherein the light guide is provided in the HMD for placement in front of an eye of a user, the light guide comprising:
   an input coupling structure that couples rays of the light that are guided through the light guide into the light guide, wherein the rays are represented in each case by wave vectors k which, if the light guide is placed in front of the eye, each have, in a coordinate system formed by a visual axis (A) as the z-axis, an x-axis extending from temporal to nasal, and a y-axis extending from caudal to cranial, a projection into the xz-plane with an absolute value of kxz and a y-component ky;
   an output coupling structure that couples the rays that were guided through the light guide out of the light guide,
   wherein the output coupling structure is oriented such that at least one of following are present:
      for all the rays that are coupled out by the output coupling structure and for which the wave vector k has a negative ratio ky/kxz after they have been coupled out, the wave vector k in the light guide (3) has a ratio of ky/kxz of greater than −0.2, and
      for all the rays that are coupled out by the output coupling structure and for which the wave vector k has a positive ratio ky/kxz after they have been coupled out, the wave vector k in the light guide has a ratio of ky/kxz of less than +0.2.

2. The light guide of claim 1, wherein the light guide includes at least two input coupling structures, which each couple in one of two different subsets of rays of the light guided through the light guide, and at least two output coupling structures, wherein each of the output coupling structures is assigned to one of the input coupling structures in a way such that each output coupling structure couples that subset of rays out of the light guide that was coupled in by the corresponding input coupling structure.

3. The light guide of claim 2, wherein the subsets of rays in the value ranges, in which the x-components kx of the wave vectors k representing them lie, differ from one another and each of the output coupling structures is oriented in each case in a way such that for all the rays of the subset of rays coupled out thereby and whose wave vector k has a negative ratio ky/kxz after they have been coupled out by the output coupling structure, the wave vector k in the light guide has a ratio of ky/kxz greater than −0.2 and/or that for all the rays of the subset of rays that are coupled out thereby and whose wave vector k has a positive ratio ky/kxz after they have been coupled out by the output coupling structure, the wave vector k in the light guide (3) has a ratio of ky/kxz of less than +0.2.

4. The light guide of claim 2, wherein:
one of the subsets of rays comprises rays that, after being coupling out, have negative y-components ky of the wave vectors k that represent them, and another one of the subset of rays comprises rays that, after being coupled out, have positive y-components ky of the wave vectors k that represent them, wherein the values of the y-components ky of the wave vectors of the two subsets have no or only a small overlap,
the output coupling structure coupling out the subset of rays that comprises rays that, after they are coupled out, have negative y-components ky of the wave vectors k that represent them is oriented such that, for all the rays of the corresponding subset of rays for which the wave vector k has a negative ratio ky/kxz after they are coupled out through the output coupling structure, the wave vector k in the light guide (3) has a ratio of ky/kxz greater than −0.2, and
the output coupling structure coupling out the subset of rays that comprises rays that, after they are coupled out, have positive y-components ky of the wave vectors k that represent them is oriented such that, for all the rays of the corresponding subset of rays for which the wave vector k has a positive ratio ky/kxz after they are coupled out through the output coupling structure, the wave vector k in the light guide (3) has a ratio of ky/kxz of less than +0.2.

5. The light guide of claim 2, wherein at least some of the subsets of rays each represent a different wavelength range of the light that is guided through the light guide.

6. The light guide of claim 2, further comprising at least two subsidiary light guides and each of the subsidiary light guides has at least one input coupling structure and one output coupling structure.

7. The light guide of claim 6, wherein at least one of the subsidiary light guides further comprises at least two input coupling structures and two output coupling structures, wherein each of the output coupling structures is assigned to one of the input coupling structures, and wherein the input coupling structures and the output coupling structures are arranged relative to one another such that the rays that are coupled in by one of the input coupling structures in the light guide or subsidiary light guide are not incident on an output coupling structure that is assigned to another input coupling structure.

8. The light guide of claim 6, wherein at least one of the subsidiary light guides comprises at least two input coupling structures and two output coupling structures, wherein each of the output coupling structures is assigned to one of the input coupling structures, and wherein the rays that are coupled out by the respective output coupling structures differ by the regions in which the angles of incidences thereof onto the output coupling structures are located.

9. The light guide of claim 2, wherein the light guide, further comprises at least two input coupling structures and two output coupling structures, wherein each of the output coupling structures is assigned to one of the input coupling structures, and wherein the input coupling structures and the output coupling structures are arranged relative to one another such that the rays that are coupled in by one of the input coupling structures in the light guide or subsidiary light guide are not incident on an output coupling structure that is assigned to another input coupling structure.

10. The light guide of claim 2, wherein the light guide, comprises at least two input coupling structures and two output coupling structures, wherein each of the output coupling structures is assigned to one of the input coupling structures, and wherein the rays that are coupled out by the respective output coupling structures differ by the regions in which the angles of incidences thereof onto the output coupling structures are located.

11. The light guide of claim 1, wherein, for a coupled-out ray, the ratio ky/kxz of the wave vector k, after it is coupled out, differs from the ratio ky/kxz of the wave vector k before it is coupled out at least by 0.1 in terms of absolute value.

12. The light guide of claim 1, wherein, for a coupled-out ray, the ratio ky/kxz of the wave vector k, after it is coupled out, differs from the ratio ky/kxz of the wave vector k before it is coupled out at most by 0.9 in terms of absolute value.

13. The light guide of claim 1, wherein the individual input coupling and output coupling structures are configured such that the coupled-out rays do not fully illuminate a specific section, or a plurality of specific sections, of an area located at a specific distance behind the output coupling structure.

14. The light guide of claim 1, wherein a diffractive or reflective structure is arranged at least between one of the existing input coupling structures and the output coupling structure that is assigned to said input coupling structure.

15. The light guide of claim 1, wherein at least one of the output coupling structures is an output coupling grating with a grating vector G and, for the rays that are coupled out by the output coupling grating, the wave vector k of a ray that is coupled out by the output coupling grating results from the vectorial sum of the wave vector k of the ray before it is incident on the output coupling grating and the grating vector G.

16. The light guide of claim 1, wherein at least one of the output coupling structures is a reflective surface.

17. The light guide of claim 1, wherein at least one of the output coupling structures is a volume hologram.

18. An HMD comprising the light guide according to claim 1.

19. A method for transmitting an image in an HMD by way of a light guide according to claim 1, wherein a totality of x-components and y-components of the wave vectors k of the rays representing the image to be transmitted form an angular spectrum of the image to be transmitted, the method comprising:
transporting the image to be transmitted in that the angular spectrum in the interior of the light guide in a manner displaced along the y-axis compared to the angular spectrum of the image to be transmitted outside the light guide.

20. The method of claim 19, further comprising:
dividing the image to be transmitted in that the angular spectrum into at least two parts;
transporting the two parts of the angular spectrum in the interior of the light guide with a different displacement along the y-axis compared to the angular spectrum of the image to be transmitted outside the light guide; and
arranging the two parts of the angular spectrum one above the other outside the light guide in the direction of the y-axis.

* * * * *

UNITED STATES PATENT AND TRADEMARK OFFICE
CERTIFICATE OF CORRECTION

PATENT NO. : 11,513,354 B2
APPLICATION NO. : 16/764386
DATED : November 29, 2022
INVENTOR(S) : Wolfgang Singer et al.

It is certified that error appears in the above-identified patent and that said Letters Patent is hereby corrected as shown below:

In the Specification

Column 11, Lines 56-57: Delete "outer surface 15 to take place, the angle of incidence θ light ray or the associated wave vector k onto the corresponding" and replace with -- outer surface 15 to take place, the angle of incidence θ of a light ray or the associated wave vector k onto the corresponding --

Column 12, Line 15: Delete "The projection of the wave vector k in the interior of the" and replace with -- The projection of the wave vector k$_i$ in the interior of the --

Column 12, Line 26: Delete "of the wave vector k in the interior of the light guide onto the" and replace with -- of the wave vector k$_i$ in the interior of the light guide onto the --

Column 12, Line 39: Delete "absolute value k$_i$ of the wave vector k in the interior of the" and replace with -- absolute value k$_i$ of the wave vector k$_i$ in the interior of the --

In the Claims

Column 22, Lines 5-12 Claim 10: Delete "The light guide of claim 2, wherein the light guide, comprises at least two input coupling structures and two output coupling structures, wherein each of the output coupling structures is assigned to one of the input coupling structures, and wherein the rays that are coupled out by the respective output coupling structures differ by the regions in which the angles of incidences thereof onto the output coupling structures are located." and replace with -- The light guide of claim 2, wherein the light guide comprises at least two input coupling structures and two output coupling structures, wherein each of the output coupling structures is assigned to one of the input coupling structures, and wherein the rays that are coupled out by the respective output coupling structures differ by the regions in which the angles of incidences thereof onto the output coupling structures are located. --

Signed and Sealed this
Twelfth Day of September, 2023

Katherine Kelly Vidal
*Director of the United States Patent and Trademark Office*